United States Patent [19]

Suzuki et al.

[11] Patent Number: 5,354,800
[45] Date of Patent: Oct. 11, 1994

[54] PRODUCTION OF COPOLYMER LATICES

[75] Inventors: Shigeo Suzuki, Suita; Susumu Abe, Takatsuki; Fuyuo Maeda; Tomotaka Seo, both of Toyonaka, all of Japan

[73] Assignee: Takeda Chemical Industries, Ltd., Osaka, Japan

[21] Appl. No.: 967,741

[22] Filed: Oct. 28, 1992

[30] Foreign Application Priority Data

| Oct. 31, 1991 | [JP] | Japan | 3-286818 |
| Oct. 31, 1991 | [JP] | Japan | 3-286819 |
| Mar. 5, 1992 | [JP] | Japan | 4-048762 |
| Mar. 11, 1992 | [JP] | Japan | 4-052853 |
| Mar. 11, 1992 | [JP] | Japan | 4-052854 |
| Mar. 11, 1992 | [JP] | Japan | 4-052855 |

[51] Int. Cl.$^5$ .............................. C08F 2/38; C08F 2/22
[52] U.S. Cl. .................................... 524/460; 524/457; 524/458; 524/742; 524/750; 524/773; 524/832; 526/222; 526/223; 526/224
[58] Field of Search ............... 524/458, 457, 460, 723, 524/742, 750, 773, 501, 856, 832; 526/222, 223, 224

[56] References Cited

U.S. PATENT DOCUMENTS

| 4,445,959 | 5/1984 | Hombach et al. | 524/750 X |
| 4,950,711 | 8/1990 | Suwala et al. | 524/742 X |

FOREIGN PATENT DOCUMENTS

| 2821835 | 11/1978 | Fed. Rep. of Germany | 524/458 |
| 57-153012 | 9/1982 | Japan . | |
| 0004501 | 1/1985 | Japan | 524/750 |
| 3-8896 | 1/1991 | Japan . | |
| 3-37203 | 2/1991 | Japan . | |
| 3229703 | 10/1991 | Japan | 524/742 |
| 4-41510 | 2/1992 | Japan . | |
| 4-57802 | 2/1992 | Japan . | |

*Primary Examiner*—Fred Teskin
*Attorney, Agent, or Firm*—Wenderoth, Lind & Ponack

[57] ABSTRACT

There is disclosed a method of producing copolymer latices which are useful as binders in paper coating compositions capable of providing coated papers with good and balanced physical characteristics, including adhesive strength, water resistance, ink acceptability and sheet gloss and which can further be used as carpet backing agents and as adhesives.

21 Claims, No Drawings

PRODUCTION OF COPOLYMER LATICES

FIELD OF THE INVENTION

This invention relates to a method of producing copolymer latices which comprises performing emulsion polymerization using particular chain transfer agents and an ingenious method of adding them. More particularly, it relates to a method of producing copolymer latices which are useful as binders in paper coating compositions capable of providing coated papers with well-balanced physical characteristics (adhesive strength, water resistance, ink acceptability, sheet gloss, etc.) and further can be used as backing agents or adhesives for carpets.

BACKGROUND OF THE INVENTION

With the recent rapid increase in the demand for coated papers, the processing speed at paper coating has been increased, and the increase in the production of printed matter has expedited speeding up of printing. In offset printing, in particular, this tendency is becoming more and more pronounced.

Therefore, a copolymer latex to be used as a binder which is one of the components of paper coating compositions is required to have the following properties.

First, it should afford good adhesive strength. When the adhesive strength is low, the mechanical force applied to the coated paper surface in the step of printing will cause the pigment to drop off and the coated layer to peel off from the base paper. The higher the printing speed is and the greater the number of overlapping printings is, the severer such paper surface destruction is. Therefore, a binder excellent in adhesion among pigment particles and between the coated layer and the base paper is required.

Second, it should have good water resistance. In particular, in offset printing where "damping water" is used, the coated paper surface is required to be resistant, in a wet state, to the mechanical force in printing or, in other words, have water resistance.

Further, with the speeding up of printing, it is required to cause much better ink acceptability as compared with the conventional binders.

In addition, coated papers are required to have not only the above properties but also optical characteristics such as sheet gloss.

While, as mentioned above, coated papers are required to have such characteristics as adhesion strength, water resistance, ink acceptability and sheet gloss, none of the prior art coated papers has these characteristics balanced at high levels. This is because the adhesive strength, water resistance, ink acceptability and sheet gloss are in contradictory relations with one another.

Thus, while it is known that the water resistance can be improved by adjusting the gel content of the polymer latex to be used as a binder to a relatively low level, a decrease in gel content results in decreased adhesive strength and decreased ink acceptability and a further decrease in said gel content leads to decreased water resistance. It is known that the ink acceptability and sheet gloss can be improved by increasing the polymer latex particle size or increasing the glass transition temperature. However, either measure encounters a difficult technological problem, namely the adhesive strength and water resistance both decrease.

SUMMARY OF THE INVENTION

The present inventors made intensive investigations in view of the above problems in the prior art and, as a result, found that when, in the emulsion polymerization of a monomer mixture comprising a conjugated diene monomer, an ethylenically unsaturated monomer and an ethylenically unsaturated carboxylic acid monomer, a hydrophilic chain transfer agent is used in the first step of polymerization and a hydrophobic chain transfer agent is used in the second step (and subsequent step or steps) of polymerization, a copolymer latex that can be used in paper coating compositions capable of giving coated papers well-balanced among adhesive strength, water resistance, ink acceptability, sheet gloss and other characteristics. Further investigations based on this finding have now led to completion of the present invention.

Thus, the invention is concerned with a method of producing copolymer latices by subjecting a monomer mixture comprising (1) at least one conjugated diene monomer, (2) at least one ethylenically unsaturated monomer and (3) at least one ethylenically unsaturated carboxylic acid monomer to emulsion polymerization, which comprises (a) subjecting a part of said monomer mixture to emulsion polymerization in the presence of a hydrophilic chain transfer agent to give a copolymer latex, and, then
(b) subjecting the remainder of the monomer mixture to emulsion polymerization in the presence of said copolymer latex and a hydrophobic chain transfer agent.

DETAILED DESCRIPTION OF THE INVENTION

The conjugated diene monomer (1) to be used in the practice of the invention includes those commonly used in the production of latices, for example 1,3-butadiene, isoprene and 2-chloro-1,3-butadiene. These monomers (1) are used singly or two or more of them are used in combination. Among them, 1,3-butadiene is particularly preferred.

The monomer (1) is used for the purpose of providing the product polymer with an appropriate level of elasticity and membrane hardness. The monomer (1) is used in an amount of about 10–80% by weight, preferably about 20–60% by weight, on the whole monomer mixture level. When it is used in amounts less than 10% by weight, the coated papers may have insufficient adhesive strength. Conversely, when it is used in amounts exceeding 80% by weight, the water resistance and adhesive strength may decrease.

The ethylenically unsaturated monomer (2) to be used in the practice of the invention includes, among others, alkenyl aromatic compounds, such as styrene, α-methylstyrene, vinyltoluene and p-methylstyrene, acrylic or methacrylic acid alkyl ester compounds, such as methyl acrylate, ethyl acrylate, butyl acrylate, 2-hydroxyethyl acrylate, methyl methacrylate, 2-hydroxyethyl methacrylate and glycidyl methacrylate, acrylamide or methacrylamide compounds, which are ethylenically unsaturated carboxylic acid amide compounds, such as acrylamide, methacrylamide, N,N-dimethylacrylamide and N-methylolacrylamide, carboxylic acid vinyl esters, such as vinyl acetate, cyanovinyl compounds, such as acrylonitrile, methacrylonitrile and α-chloroacrylonitrile, ethylenically unsaturated amine compounds, such as methylaminoethyl (meth)acrylate, dimethylaminoethyl (meth)acrylate, dimethylaminopropyl (meth)acrylate, dibutylaminoethyl (meth)acrylate, dimethylaminoethyl(meth)acrylamide, dimethylaminopropyl(meth)acrylamide, 2-vinylpyridine and 4-vinylpyridine, and other ethylenically unsaturated monomers than those category (3) monomers to be mentioned later herein. Such monomers may be used either singly or in combination. Particularly preferred among these are styrene as an alkenyl aromatic compound, methyl methacrylate as an alkyl ester compound, and acrylonitrile as a cyanovinyl compound.

The monomer (2) is used in an amount of about 20–90% by weight, preferably about 40–80% by weight, on the whole monomer mixture basis. When it is used in excessively small amounts, the water resistance of coated paper products may be poor. Conversely, when it is used in excess, the stiffness may become too high, causing decreases in adhesive strength.

The ethylenically unsaturated carboxylic acid monomer (3) to be used in the practice of the invention includes, among others, monocarboxylic acids, such as acrylic acid, methacrylic acid and crotonic acid, dicarboxylic acids and anhydrides thereof, such as maleic acid, fumaric acid and itaconic acid, and half esters, such as methyl maleate and methyl itaconate. These may be used either alone or in combination.

The monomer (3) is used in an amount of about 0.2–12% by weight, preferably about 0.5–8% by weight, on the whole monomer mixture basis. When it is used in smaller amounts, the mechanical stability of paper coating compositions and the adhesive strength of coated papers may be insufficient. When it is used in excess, the product copolymer latex may have an excessively high viscosity, rendering it unsuited for practical use.

The hydrophilic chain transfer agent, particularly, one which has a solubility in water at 20° C. of at least 0.006 mole per liter and is to be used in the practice of the invention (hereinafter referred to as "highly soluble chain transfer agent") may be any one provided that it has such solubility. Thus, it includes, among others, alkylmercaptans containing not more than 4 carbon atoms, such as ethylmercaptan and n-butylmercaptan, mercaptocarboxylic acids, such as 2-mercaptopropionic acid, 3-mercaptopropionic acid and mercaptoacetic acid, or salts thereof (e.g. ammonium mercaptoacetate), mercaptodicarboxylic acids, such as mercaptosuccinic acid, or salts thereof (e.g. mercaptodicarboxylic acid salts), hydroxyl-containing mercaptans, such as 2-mercaptoethanol and 3-mercapto-1,2-propanediol, amino-containing mercaptans, such as 2-mercaptoethylamine, carboxyl-containing monosulfides, such as thiodiglycolic acid and 3,3'-thiodipropionic acid, or salts thereof, hydroxyl-containing monosulfides, such as β-thiodiglycol, amino-containing monosulfides, such as thiodiethylamine, carboxyl-containing disulfides, such as dithiodiglycolic acid, 2,2'-dithiodipropionic acid, 3,3'-dithiodipropionic acid and 4,4'-dithiodibutyric acid, or salts thereof, monosulfide and disulfide acid anhydrides, such as thiodiglycolic anhydride, carboxyl- and amino-containing monosulfides and disulfides, such as D-, L- or DL-cystine, hydroxyl-containing halogenated hydrocarbons, such as chloromethanol, 2-chloroethanol, 1-chloro-2-propanol, 2- or 3-chloro-n-propanol, 2-, 3- or 4-chloro-n-butanol and chloropentanol, carboxyl-containing halogenated hydrocarbons, such as monochloroacetic acid, dichloroacetic acid, trichloroacetic acid, chlorodifluoroacetic acid, 2-chloropropionic acid, 3-chloropropionic acid, 2-bromopropionic acid, 3-bromopropionic acid, 2-bromopentanoic acid, chlorosuccinic acid, chlorofumaric acid, chloromaleic acid and chloromalonic acid, or salts thereof, and halogenated hydrocarbon acid anhydrides, such as chloromaleic anhydride.

Among the highly soluble chain transfer agents usable in the practice of the invention, those having at least one carboxyl group have good polymerization stability, scarcely giving fine coagulated matters, and therefore are preferably used in the practice of the invention.

In all the polymerization steps (a) and (b), the highly soluble chain transfer agents are used in a total amount of about 0.005–8 parts by weight, preferably about 0.01–5 parts by weight, per 100 parts by weight of the whole monomer mixture. When they are used in amounts less than 0.005 part by weight, the adhesive strength and/or water resistance may be inferior. When they are used in amounts exceeding 8 parts by weight, the adhesive strength may decrease. These are used either singly or in combination.

The hydrophobic chain transfer agent, particularly, one having a solubility in water at 20° C. of less than 0.006 mole per liter (hereinafter referred to as "poorly soluble chain transfer agent"), which is to be used in accordance with the invention, may be any of those known chain transfer agents commonly used in emulsion polymerization and having a solubility in water at 20° C. of less than 0.006 mole per liter and, more specifically, includes alkylmercaptans containing at least 5 carbon atoms, such as hexylmercaptan, octylmercaptan, n-dodecylmercaptan, tert-dodecylmercaptan, n-hexadecylmercaptan, tert-hexadecylmercaptan, n-tetradecylmercaptan and tert-tetradecylmercaptan, xanthogen disulfides, such as dimethylxanthogen disulfide, diethylxanthogen disulfide and diisopropylxanthogen disulfide, thiuram disulfides, such as tetramethylthiuram disulfide, tetraethylthiuram disulfide and tetrabutylthiuram disulfide, halogenated hydrocarbons, such as carbon tetrachloride, carbon tetrabromide and ethylene bromide, 2-ethylhexyl thioglycolate, α-methylstyrene dimer, terpinolene, α-terpinene, γ-terpinene, dipentene, and so forth. In accordance with the invention, a carboxylic acid mercaptoalkyl ester of the formula (I) shown below is also used as a poorly soluble chain transfer agent.

wherein $R_1$ is a univalent hydrocarbon residue and $R_2$ is a bivalent hydrocarbon residue.

The univalent hydrocarbon residue represented by $R_1$ includes, among others, alkyl groups containing 1–24, preferably 1–12, carbon atoms, such as methyl, ethyl, propyl, butyl and octyl, cycloalkyl groups containing 3–12, preferably 4–8, carbon atoms, such as cyclobutyl, cyclopentyl, cyclohexyl and dimethylcyclohexyl, alkenyl groups containing 2–24, preferably 2–4 or 12–24, carbon atoms, such as vinyl, allyl and 2-butenyl, alkynyl groups containing 2–18, preferably 2–4, carbon atoms, such as ethynyl, propynyl and butynyl, aryl groups containing 6–12, preferably 6–10, carbon atoms, such as phenyl, tolyl and naphthyl, and aralkyl groups containing 6–12, preferably 7–11, carbon atoms, such as benzyl, phenylethyl and naphthylmethyl. The bivalent hydrocarbon residue represented by $R_2$ includes those bivalent hydrocarbon residues that are derivable from the above-mentioned univalent hydrocarbon residues represented by $R_1$ by removal of one optionally chosen hydrogen atom therefrom. The hydrocarbon residues represented by $R_1$ and $R_2$ may optionally have one or more substituents each selected from among halogen, alkoxy of 1–8 carbon atoms, alkyl of 1–8 carbon atoms and the like hydrophobic substituents.

The above-mentioned halogen includes fluorine, chlorine, bromine, etc., the alkoxy includes methoxy, ethoxy, propoxy, butoxy, etc., and the alkyl includes methyl, ethyl, propyl, etc.

As typical examples of the above-mentioned poorly soluble chain transfer agent of the formula (I), there may be mentioned 2-mercaptoethyl propionate, 4-mercaptobutyl propionate, 4-mercaptopentyl propionate, 5-mercaptopentyl propionate, 6-mercaptohexyl propionate, 8-mercaptooctyl propionate, 2-mercaptoethyl butanoate, 6-mercaptohexyl butanoate, 8-mercaptooctyl butanoate, mercaptomethyl pentanoate, 2-mercaptoethyl pentanoate, 5-mercaptohexyl pentanoate, 6-mercaptohexyl pentanoate, 2-mercaptoethyl hexanoate, 3-mercaptopropyl hexanoate, 7-mercaptoheptyl hexanoate, 8-mercaptooctyl hexanoate, 12-mercaptododecyl hexanoate, 2-mercaptoethyl heptanoate, 4-mercaptobutyl heptanoate, 5-mercaptopentyl heptanoate, 6-mercaptohexyl heptanoate, 7-mercaptoheptyl heptanoate, 10-mercaptodecyl heptanoate, mercaptomethyl octanoate, 2-mercaptoethyl octanoate, 4-mercaptobutyl octanoate, 6-mercaptohexyl octanoate, 8-mercaptooctyl octanoate, 10-mercaptodecyl octanoate, 12-mercaptododecyl octanoate and 16-mercaptohexadecyl octanoate.

As the poorly soluble chain transfer agent is also used a mercaptocarboxylic acid alkoxyalkyl ester and, more specifically, includes, for example, compounds of the following formula

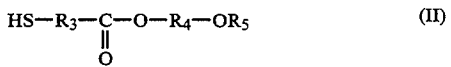

(II)

wherein $R_3$ is a bivalent hydrocarbon residue, $R_4$ is an alkyl and $OR_5$ is an alkoxy.

The bivalent hydrocarbon residue represented by $R_3$ includes bivalent hydrocarbon residues described above in the formula (I). The alkyl represented by $R_4$ includes alkyl groups containing 1–18, preferably 1–12 carbon atoms, such as methyl, ethyl, propyl, butyl, pentyl, hexyl and octyl. The alkoxy represented by $OR_5$ includes alkoxy groups containing 1–12, preferably 1–8 carbon atoms, such as methoxy, ethoxy, propoxy, isopropoxy, butoxy, pentyloxy and hexyloxy.

The bivalent hydrocarbon residue represented by $R_3$, the alkyl represented by $R_4$ and the alkoxy represented by $OR_5$ each may optionally have one or more substituents each selected from among halogen, alkoxy of 1–8 carbon atoms, alkyl of 1–8 carbon atoms and the like hydrophobic substituents.

The above-mentioned halogen includes fluorine, chlorine, bromine, etc., the alkoxy includes methoxy, ethoxy, propoxy, butoxy, etc., and the alkyl includes methyl, ethyl, propyl, etc.

As typical examples of the above-mentioned chain transfer agent of general formula (II), there may be mentioned mercaptoacetic acid alkoxyalkyl esters, such as methoxyethyl mercaptoacetate, methoxypropyl mercaptoacetate, ethoxypropyl mercaptoacetate, methoxybutyl mercaptoacetate, ethoxybutyl mercaptoacetate, methoxypentyl mercaptoacetate, ethoxypentyl mercaptoacetate, propoxypentyl mercaptoacetate, methoxyhexyl mercaptoacetate, ethoxyhexyl mercaptoacetate, butoxyhexyl mercaptoacetate, methoxyoctyl mercaptoacetate and ethoxyoctyl mercaptoacetate, mercaptopropionic acid alkoxyalkyl esters, such as methoxymethyl mercaptopropionate, methoxyethyl mercaptopropionate, methoxypropyl percaptopropionate, methoxybutyl mercaptopropionate, ethoxybutyl mercaptopropionate, methoxpentyl mercaptopropionate, ethoxypentyl mercaptopropionate, methoxyhexyl mercaptopropionate, butoxyhexyl mercaptopropionate, methoxyoctyl mercaptopropionate, ethoxyoctyl mercaptopropionate and hexyloxyoctyl mercaptopropionate, mercaptobutanoic acid alkoxyalkyl esters, such as methoxymethyl mercaptobutanoate, methoxyethyl mercaptobutanoate, ethoxypropyl mercaptobutanoate, methoxybutyl mercaptobutanoate, ethoxybutyl mercaptobutanoate, methoxypentyl mercaptobutanoate, propoxyhexyl mercaptobutanoate, ethoxyoctyl mercaptobutanoate and methoxydecyl mercaptobutanoate, mercaptopentanoic acid alkoxyalkyl esters, such as methoxyethyl mercaptopentanoate, ethoxybutyl mercaptopentanoate, ethoxyhexyl mercaptopentanoate, propoxydecyl mercaptopentanoate and ethoxydodecyl mercaptopentanoate, mercaptohexanoic acid alkoxyalkyl esters, such as methoxypropyl mercaptohexanoate, ethoxypentyl mercaptohexanoate and propoxyheptyl mercaptohexanoate, mercaptoheptanoic acid alkoxyalkyl esters, such as methoxybutyl mercaptoheptanoate, ethoxyhexyl mercaptoheptanoate and methoxynonyl mercaptoheptanoate, and mercaptooctanoic acid alkoxyalkyl esters, such as ethoxyethyl mercaptooctanoate, methoxypropyl mercaptooctanoate, methoxybutyl mercaptooctanoate, ethoxyhexyl mercaptooctanoate and hexyloxyoctyl mercaptooctanoate.

Further, as the poorly soluble chain transfer agent is used a dialkenyl (di)sulfide. The dialkenyl (di)sulfide may be any (di)sulfide, either homo or hetero, provided that both the bonding hands of the sulfide or disulfide are each bound to an alkenyl group having an unsaturated bond in its β-position. As typical examples, there may be mentioned, diallyl sulfide, diallyl disulfide, dibutynyl sulfide, dibutynyl disulfide, allyl butynyl sulfide and allyl butynyl disulfide. The alkenyl moieties of these may be substituted by a hydrophobic group. As the hydrophobic group, there may be mentioned, for example, halogen atoms, such as fluorine, chlorine and bromine, alkoxy groups containing 1 to 8 carbon atoms, such as methoxy, ethoxy and butoxy, and alkyl groups containing 1 to 8 carbon atoms, such as methyl, ethyl and propyl. These are used singly or two or more of them are used in combination. Among them, alkylmercaptans containing 12 to 16 carbon atoms, such as n-dodecylmercaptan, tert-dodecylmercaptan, n-tetradecylmercaptan, tert-tetradecylmercaptan, n-hexadecylmercaptan, tert-hexadecylmercaptan, xanthogen disulfides such as dimethylxanthogen disulfide, diethylxanthogen disulfide, thiuram disulfides such as tetramethylthiuram disulfide, tetraethylthiuram disulfide, carbon tetrachloride, mercaptocarboxylic acid alkyl esters such as 2-ethylhexyl thioglycolate, α-methylstyrene dimer, terpinolene, carboxylic acid mercaptoalkyl esters such as 2-mercaptoethyl octanoate, 2-mercaptoethyl hexanoate, mercapto carboxylic acid alkoxy alkyl esters such as methoxybutyl mercaptoacetate, methoxybutyl mercaptopropionate, dialkenyl (di)sulfides such as diallyl (di) sulfide and the like are preferred.

In all the polymerization steps (a) and (b), the poorly soluble chain transfer agent is used in an amount of less than about 99.5% by weight, preferably less than about 98% by weight, on the whole chain transfer agent basis.

When it is used in an amount of 99.5% by weight or more, the product coated papers may sometimes be inferior in adhesive strength, wager resistance, ink acceptability, sheet gloss and other physical characteristics.

The copolymer latices of the present invention can be obtained by performing emulsion polymerization in the conventional manner, namely by adding the monomer mixture, a polymerization initiator, an emulsifier and the chain transfer agent(s) to an aqueous medium (e.g. water).

The polymerization initiator to be used in the emulsion polymerization of the invention is not limited to any particular species but may include inorganic persulfates, such as potassium persulfate, sodium persulfate and ammonium persulfate, organic peroxides, such as cumene hydroperoxide, benzoyl peroxide and isopropylbenzene peroxide, and azo initiators, such as azobisisobutyronitrile. These may be used either singly or in combination. Among them, persulfates such as potassium persulfate, sodium persulfate and ammonium persulfate are preferred from the polymerization stability viewpoint.

Said polymerization initiator may be used in the so-called redox system polymerization initiator in which a reducing agent, such as sodium bisulfite or ferrous sulfate, is combinedly used.

In the practice of the invention, the polymerization initiator is used generally in an amount of about 0.1–5 parts by weight, preferably about 0.2–2 parts by weight, per 100 parts of the whole monomer mixture.

The emulsifier to be used in the emulsion polymerization of the present invention is not limited to any particular species but may include, among others, anionic surfactants, such as sodium dodecylbenzenesulfonate, sodium lauryl sulfate, sodium dodecyldiphenyl ether disulfonate, dialkyl sulfosuccinate sodium salt, nonionic surfactants, such as polyoxyethylene alkyl ethers and polyoxyethylene alkylaryl ethers, and amphoteric surfactants, inclusive of alkylbetaine salts, such as laurylbetaine and stearylbetaine salts, and amino acid type surfactants, such as lauryl-$\beta$-alanine, lauryldi(aminoethyl)glycine and octyldi(aminoethyl)glycine salts. These may be used singly or two or more of them may be used in combination. Among these emulsifiers, sodium dodecylbenzenesulfonate, sodium dodecyldiphenyl ether disulfonate and the like are particularly preferred.

The emulsifier is used generally in an amount of about 0.05–2.5 parts by weight, preferably about 0.1–1.5 parts by weight, per 100 parts by weight of the whole monomer mixture. When the emulsifier is used in amounts exceeding 2.5 parts by weight, the product coated papers will have poor water resistance and the paper coating compositions may foam vigorously in certain instances.

When necessary, chelating agents, such as sodium ethylenediaminetetraacetate, dispersants, such as sodium formaldehydesulfoxylate, and inorganic salts may also be added.

The copolymer latex producing method of the invention is a multistep polymerization method in which the monomer mixture is polymerized in two or more steps. Thus, (a) first, a part of the above-mentioned monomer mixture, particularly, 0.5–60 parts by weight out of the monomer mixture is subjected to emulsion polymerization in the presence of a highly soluble chain transfer agent, particularly, one having a solubility in water at 20° C. of at least 0.006 mole per liter, to give a copolymer latex, and, (b) then, the remainder of the monomer mixture is subjected to emulsion polymerization in the presence of said copolymer latex and a poorly soluble chain transfer agent, particularly, one having a solubility in water at 20° C. of less than 0.006 mole per liter.

On that occasion, a poorly soluble chain transfer agent may be used combinedly in the polymerization step (a) and a highly soluble chain transfer agent may be used combinedly in the polymerization step (b). However, the highly soluble chain transfer agent should account for at least about 20% by weight, preferably at least about 25% by weight, of the sum of the chain transfer agents used in the polymerization step (a), and the poorly soluble chain transfer agent should account for at least about 40% by weight, preferably at least about 50% by weight, of the sum of the chain transfer agents used in the polymerization step (b).

In each step, the monomer mixture and chain transfer agent mixture may be added by the batchwise addition method or continuous addition method, or a combination of both methods. In the case of continuous addition, the composition and amount of the monomer mixture and/or of the chain transfer agent mixture may be varied within the respective ranges mentioned above either continuously or intermittently.

The degree of conversion in the copolymer latex production according to the invention is preferably about 90% by weight or more, more preferably about 95% by weight or more.

Instead of the above-mentioned multistep polymerization method, a one step polymerization method can be also adopted when the following poorly soluble chain transfer agents are used. Such poorly soluble chain transfer agents are the carboxylic acid mercaptoalkyl ester, the mercaptocarboxylic acid alkoxyalkyl ester and the dialkyl (di)sulfide respectively mentioned above.

These chain transfer agents are used in an amount of about 0.01–10 parts by weight, preferably about 0.1–5 parts by weight, per 100 parts by weight of the whole monomer mixture. When they are used in an amount of less than 0.1 part by weight, the adhesive strength and/or water resistance may be poor and, when they are used in an amount exceeding 10 parts by weight, the adhesive strength may decrease as well. These are used singly or two or more of them are used in combination.

In the practice of the invention, the above-mentioned chain transfer agents may be used in combination with any other known chain transfer agent, when necessary. The chain transfer agent that can be used combinedly may be any of those known chain transfer agents that are generally used in emulsion polymerization and, more specifically, includes, among others, mercaptans, such as octylmercaptan, n-dodecylmercaptan, tert-dodecylmercaptan, n-hexadecylmercaptan, tert-hexadecylmercaptan, n-tetradecylmercaptan and tert-tetradecylmercaptan, xanthogen disulfides, such as dimethylxanthogen disulfide, diethylxanthogen disulfide and diisopropylxanthogen disulfide, thiuram disulfides, such as tetramethylthiuram disulfide, tetraethylthiuram disulfide and tetrabutylthiuram disulfide, halogenated hydrocarbons, such as carbon tetrachloride, carbon tetrabromide and ethylene bromide, mercaptocarboxylic acid alkyl esters, such as ethylhexyl mercaptoacetate, octyl mercaptopropionate and tridecyl mercaptopropionate, and, further, allyl alcohol, α-methylstyrene dimer, terpinolene, α-terpinene, γ-terpinene, dipentene and anisol. These may be used singly or two or more of them may be used in combination. Among them, mercaptans, xanthogen disulfides, thiuram disulfides, carbon tetrachloride, mercaptocarboxylic acid alkyl esters, α-methylstyrene dimer, terpinolene and the like are preferred.

These known chain transfer agents are used in an amount of less than about 95% by weight, preferably less than about 90% by weight, on the whole chain transfer agent basis.

When they are used in an amount of 95% by weight or more, the product coated papers may sometimes be inferior in adhesive strength, water resistance, ink acceptability, sheet gloss and other physical characteristics.

The copolymer latices can be obtained by performing emulsion polymerization similar to the manner mentioned above, namely by adding the monomer mixture, a polymerization initiator, an emulsifier and the chain transfer agent(s) to an aqueous medium (e.g. water).

The copolymer latices of the present invention can be used as binders in paper coating compositions, and as various adhesive components in carpet backing compositions, paint compositions, adhesive compositions for industrial and household use, and so forth. They are advantageously used as binders in paper coating compositions, among others.

In preparing paper coating compositions using the copolymer latices of the invention, inorganic pigments, such as kaolin, clay, talc, titanium dioxide, calcium carbonate, aluminum hydroxide and satin white, natural binders, such as casein, starch and proteins, and/or synthetic latices, such as polyvinyl alcohol and polyvinyl acetate emulsions, are added each in an appropriate amount by a per se known method.

When necessary, such known ingredients as dispersants, antifoams, leveling agents, preservatives, insolubilizing agents and mold release agents may further be added.

The paper coating compositions containing the copolymer latices of the invention may be applied by a per se known method, for example by using an air knife coater, blade coater, roll coater or applicator, for instance.

The copolymer latices produced by the method of the invention are well-balanced and excellent in such physical characteristics as adhesive strength, water resistance, ink acceptability and sheet gloss and therefore can advantageously be used as binders in paper coating compositions for the production of coated papers, in particular coated papers for offset rotary printing, and can further be used as adhesive components in various applications, such as carpet backing agents, paints, adhesives for industrial and/or household use, etc.

EXAMPLES

The following specific working examples illustrate the present invention in further detail. In the examples, "%" and "part(s)" are always on the weight basis.

Example 1

A 5-liter autoclave purged with nitrogen was charged with 5 parts of 1,3-butadiene, 6 parts of styrene, 2 parts of methyl methacrylate, 2 parts of fumaric acid, 0.5 part of potassium persulfate, 100 parts of water, 0.1 part of sodium alkylbenzenesulfonate and 0.05 part of 2-mercaptopropionic acid, and the reaction was carried out at 70° C. with stirring. After 2 hours, the remaining monomers, namely 30 parts of 1,3-butadiene, 45 parts of styrene, 8 parts of methyl methacrylate, 1 part of acrylic acid and 1 part of methacrylic acid, and 0.2 part of 2-mercaptopropionic acid and 0.2 part of tert-dodecylmercaptan were charged, together with 0.5 part of sodium alkylbenzenesulfonate. When the reaction period amounted to 15 hours, a conversion of 97% or more (per 100 parts of monomers) was attained. The reaction mixture was then cooled to 30° C., and adjusted to pH 7.5±0.2 with sodium hydroxide. The unreacted monomers were eliminated from the mixture by blowing steam thereinto. The latex was further concentrated to a solid content of 50%, whereby a desired latex was obtained.

Using the latex thus obtained, a paper coating composition was prepared according to the following formulation:

| | |
|---|---|
| Ultra White 90 (product of Engelhard Corp., First class Kaolin) | 70 parts |
| Carbital 90 (product of ECC, ground calcium carbonate) | 30 parts |
| Aron T-40 (product of Toagosei Chemical Industry, sodium polyacrylate) | 0.1 part |
| Copolymer latex | 14 parts |
| Modified starch MS-4600 (product of Nihon Shokuhin Kako) | 3 parts |
| Water | to make a whole solid content of 60% by weight |

This paper coating composition was applied to both sides of a wood-free paper having a basis weight of 64 g/m², the coating weight being 15.0±0.5 g/m³. The paper was then dried in a fan drier (120° C.) for 30 seconds. The coated paper thus obtained was allowed to stand at 23° C. and 60% RH for 24 hours and then subjected to two repetitions of super calendering at a linear pressure of 100 kg/cm and a roll temperature of 70° C. Some typical physical characteristics of the coated paper obtained were measured. The results are shown in Table 9.

Examples 2 to 21

Proceeding in the same manner as in Example 1 except that the monomer compositions and chain transfer agent combinations specified in Tables 1–3 and Tables 5–7, respectively, were used, latices were produced by emulsion polymerization and paper coating compositions were prepared therefrom and applied to paper to give coated papers. Typical physical properties of the coated papers obtained were measured. The results are shown in Tables 9–11.

Comparative Examples 1 to 8

Proceeding in the same manner as in Example 1 except that the monomer compositions and chain transfer agent combinations specified in Table 4 and Table 8, respectively, were used, latices were produced by emulsion polymerization and paper coating compositions were prepared therefrom and applied to paper to give coated papers. Typical physical characteristics of the coated papers obtained were measured. The results are shown in Table 12.

The physical characteristics reported in Tables 9–12 were measured or evaluated by the following methods:

(1) Gel Content

The copolymer latex obtained is cast into a glass mold to give a film with a thickness of 0.3 mm. This film is cut to pieces 2–3 mm square and 0.4 g thereof is weighed exactly. The weighed sample is immersed in 100 ml of toluene and the whole is shaken in a constant-temperature bath (30° C.) for 6 hours and then filtered through a 100-mesh wire gauze. The solid content is thus determined and the gel content is calculated from this sol solid content.

(2) Adhesive Strength (Dry Pick Resistance)

Several overlapping printings are performed with a tack No. 10 black ink using an RI tester (Akira Seisakusho). The printed face is evaluated for picking on a 5-point scale with the naked eye. The higher the figure is, the better the adhesive strength is.

(3) Water Resistance (Wet Pick Resistance)

Using the RI tester, the test piece surface is damped by means of a Morton roll, immediately followed by printing with a tack No. 12 red ink. The printed face is evaluated for picking on a 5-point scale with the naked eye. The higher the figure is, the better the water resistance is.

(4) Ink Acceptability

The procedure is essentially the same as that for water resistance evaluation except that an ink with a lower tack value is used to thereby avoid picking. The ink transfer is comparatively evaluated on a 5-point scale with the naked eye. The higher the figure is, the better the ink acceptability is.

(5) Sheet Gloss

The gloss value of the coated paper is measured at 75°—75° using a Murakami gloss meter.

(6) Blister Resistance

Solid printing is performed on both sides with a web offset printing ink, and the temperature at which blistering takes place is measured using a blister tester (Kumagai Riki).

The results obtained in the examples and comparative examples clearly indicate that the coated papers obtained by using the copolymer latices of the present invention have good and balanced physical characteristics from the viewpoints of adhesive strength, water resistance, ink acceptability and sheet gloss and that when synthetically evaluated as coated papers from the physical characteristics viewpoint, they are superior.

TABLE 1

| Step | Composition (parts) | Example 1 | 2 | 3 | 4 | 5 | 6 | 7 |
|---|---|---|---|---|---|---|---|---|
| 1st | Monomers | | | | | | | |
| | Butadiene | 5 | 5 | 5 | 5 | 10 | 10 | 8 |
| | Styrene | 6 | 6 | 8 | 10 | 10 | 20 | 10 |
| | Methyl methacrylate | 2 | 2 | 5 | 10 | 5 | 2 | 10 |
| | Acrylonitrile | | 5 | 2.5 | | | 5 | |
| | Acrylamide | | | 2 | | | | 1 |
| | 2-Hydroxyethyl acrylate | | | | | 1 | | |
| | Fumaric acid | 2 | | | | | 3 | |
| | Itaconic acid | | 2 | 1 | | 1 | | 2 |
| | Acrylic acid | | | | 1 | | 1 | |
| | Methacrylic acid | | | | 1 | | | |
| | Chain transfer agents | | | | | | | |
| | (1) Highly soluble chain transfer agent(s) | | | | | | | |
| | 2-Mercaptoethanol | | | 0.01 | | | | |
| | Mercaptoacetic acid | | | | 0.2 | | | |
| | 2-Mercaptopropionic acid | 0.05 | | | | | | |
| | β-Thiodiglycol | | | | | | | 0.4 |
| | Thiodiglycolic acid | | 0.05 | | | | | |
| | L-Cystine | | | | | 0.5 | | |
| | 2,2′-Dithiosalicylic acid | | | | | | | |
| | 3,3′-Dithiodipropionic acid | | | | | | | 0.1 |
| | 2-Chloroethanol | | | | | | | |
| | Trichloroacetic acid | | | | | | | 0.05 |
| | 2-Bromopropionic acid | | | | 0.05 | | | |
| | (2) Poorly soluble chain transfer agent | | | | | | | |
| | Carbon tetrachloride | | | | 0.5 | | | |
| | t-Dodecylmercaptan | | 0.05 | 0.04 | | | | 0.1 |
| | n-Tetradecylmercaptan | | | | | | | |
| | t-Hexadecylmercaptan | | | | | | | |
| | n-Hexadecylmercaptan | | | | | | | |
| | Polymerization initiator(s) | | | | | | | |
| | Potassium persulfate | 0.5 | | 0.2 | 1.5 | 1 | 0.5 | 0.2 |
| | Sodium persulfate | | 0.3 | | | | | |
| | Azobisisobutyronitrile | | | | | | | 0.2 |

TABLE 2

| Step | Composition (parts) | Example 8 | 9 | 10 | 11 | 12 | 13 | 14 |
|---|---|---|---|---|---|---|---|---|
| 1st | Monomers | | | | | | | |
| | Butadiene | 8 | 8 | 15 | 15 | 15 | 15 | 5 |
| | Styrene | 10 | 10 | 6 | 10 | 10 | 10 | 6 |
| | Methyl methacrylate | | | 2 | 10 | 5 | 5 | 2 |
| | Acrylonitrile | 1 | 1 | | | | 5 | |
| | Acrylamide | | | | | | | |
| | 2-Hydroxyethyl acrylate | | | | | | | |
| | Fumaric acid | 2 | 2 | 2 | | 1 | 1 | 2 |
| | Itaconic acid | | | | | | 1 | |
| | Acrylic acid | | | | 1 | 1 | | |
| | Methacrylic acid | 1 | 1 | | 1 | | | |
| | Chain transfer agents | | | | | | | |
| | (1) Highly soluble chain transfer agent | | | | | | | |
| | 2-Mercaptoethanol | | | 0.15 | | | | |
| | Mercaptoacetic acid | | | | | | | |
| | 2-Mercaptopropionic acid | | | | | | | 0.1 |
| | β-Thiodiglycol | | | | | | | |
| | Thiodiglycolic acid | | | | | 0.27 | | |
| | L-Cystine | | 0.5 | | | | 1 | |
| | 2,2'-Dithiosalicylic acid | | | | | | | |
| | 3,3'-Dithiodipropionic acid | | | | | 0.2 | | |
| | 2-Chloroethanol | 1 | | 0.2 | | | | |
| | Trichloroacetic acid | | | | | | | |
| | 2-Bromopropionic acid | | | | | | | |
| | (2) Poorly soluble chain transfer agent(s) | | | | | | | |
| | Carbon tetrachloride | 1 | 0.5 | | 0.5 | | 3 | |
| | t-Dodecylmercaptan | | 0.1 | | | | | 0.2 |
| | n-Tetradecylmercaptan | | | | | | | |
| | t-Hexadecylmercaptan | | | | | | | |
| | n-Hexadecylmercaptan | | | | | | | |
| | Polymerization initiator | | | | | | | |
| | Potassium persulfate | | | 1.5 | 1.5 | | | 0.2 |
| | Sodium persulfate | | | | | 1.5 | 1.5 | 0.5 | 0.2 |
| | Azobisisobutyronitrile | 0.5 | | | | | | |

TABLE 3

| Step | Composition (parts) | Example 15 | 16 | 17 | 18 | 19 | 20 | 21 |
|---|---|---|---|---|---|---|---|---|
| 1st | Monomers | | | | | | | |
| | Butadiene | 5 | 1 | 20 | 15 | 5 | 5 | 5 |
| | Styrene | 6 | 1 | 30 | 20 | 6 | 6 | 8 |
| | Methyl methacrylate | 2 | 0.5 | 5 | 5.5 | 2 | 2 | 5 |
| | Acrylonitrile | | | | 5 | | 5 | 2.5 |
| | Acrylamide | | 0.2 | | 0.5 | | | 2 |
| | 2-Hydroxyethyl acrylate | | | | | | | 0 |
| | Fumaric acid | 2 | | 2 | | 2 | | |
| | Itaconic acid | | | 1 | 2 | | 2 | 1 |
| | Acrylic acid | | | | | 0 | 0 | |
| | Methacrylic acid | | | | 1 | 0 | | 0 |
| | Chain transfer agents | | | | | | | |
| | (1) Highly soluble chain transfer agent(s) | | | | | | | |
| | 2-Mercaptoethanol | | | | | 0.3 | | |
| | Mercaptoacetic acid | | | 0.4 | | | | |
| | 2-Mercaptopropionic acid | | | | | | | |
| | β-Thiodiglycol | 0.1 | | | | | | 0 |
| | Thiodiglycolic acid | | | | 0.15 | | 0.1 | |
| | L-Cystine | | 0.02 | | | | 0.2 | |
| | 2,2'-Dithiosalicylic acid | | | | | | | |
| | 3,3'-Dithiodipropionic acid | | | | | | | 0.3 |
| | 2-Chloroethanol | | | | | | | |
| | Trichloroacetic acid | | | | 0.55 | | | |
| | 2-Bromopropionic acid | 0.2 | | | | | | |
| | (2) Poorly soluble chain transfer agent(s) | | | | | | | |
| | Carbon tetrachloride | | | 0.8 | | | | |
| | t-Dodecylmercaptan | | | 0.2 | | | | |
| | n-Tetradecylmercaptan | | | | | 0.1 | | |
| | t-Hexadecylmercaptan | | | | | | 0.4 | |
| | n-Hexadecylmercaptan | | | | | | | 0.2 |
| | Polymerization initiator | | | | | | | |
| | Potassium persulfate | | 0.4 | | 0.4 | 0.5 | | 0.2 |

TABLE 3-continued

| Step | Composition (parts) | Example 15 | 16 | 17 | 18 | 19 | 20 | 21 |
|---|---|---|---|---|---|---|---|---|
| | Sodium persulfate | 0.5 | | | | | 0.3 | |
| | Azobisisobutyronitrile | 0.2 | | 0.6 | | | | |

TABLE 4

| Step | Composition (parts) | Comparative Example 1 | 2 | 3 | 4 | 5 | 6 | 7 | 8 |
|---|---|---|---|---|---|---|---|---|---|
| 1st | Monomers | | | | | | | | |
| | Butadiene | 5 | 5 | 5 | 5 | 5 | 1 | 20 | 15 |
| | Styrene | 6 | 6 | 8 | 10 | 6 | 1 | 30 | 20 |
| | Methyl methacrylate | 2 | 2 | 5 | 10 | 2 | 0.5 | 5 | 5.5 |
| | Acrylonitrile | | 5 | 2.5 | | | | | 5 |
| | Acrylamide | | | 2 | | | 0.2 | | 0.5 |
| | 2-Hydroxyethyl acrylate | | | | | | | | |
| | Fumaric acid | 2 | | | | 2 | | 2 | |
| | Itaconic acid | | 2 | 1 | | | | 1 | 2 |
| | Acrylic acid | | | | 1 | | | | 1 |
| | Methacrylic acid | | | | 1 | | | | |
| | Chain transfer agents | | | | | | | | |
| | (1) Highly soluble chain transfer agent | | | | | | | | |
| | 2-Mercaptoethanol | | | | | | | 0.2 | |
| | Mercaptoacetic acid | | | | | | | | |
| | 2-Mercaptopropionic acid | | | | | | | | |
| | β-Thiodiglycol | | | | | | | | |
| | Thiodiglycolic acid | | | | | | | | |
| | L-Cystine | | | | | | | | |
| | 2,2'-Dithiosalicylic acid | | | | | | | | |
| | 3,3'-Dithiodipropionic acid | | | | 0.2 | | | | |
| | 2-Chloroethanol | | | | | | | | 0.1 |
| | Trichloroacetic acid | | | | | | | | |
| | 2-Bromopropionic acid | | | | | | | | |
| | (2) Poorly soluble chain transfer agent(s) | | | | | | | | |
| | Carbon tetrachloride | | 1.5 | 1 | 1.5 | | | | |
| | t-Dodecylmercaptan | 0.15 | | 0.2 | | 0.1 | 0.05 | | 0.1 |
| | n-Tetradecylmercaptan | | | | | | | | |
| | t-Hexadecylmercaptan | | | | | | | | |
| | n-Hexadecylmercaptan | | | | | | | | |
| | Polymerization initiator | | | | | | | | |
| | Potassium persulfat | 0.5 | | 0.2 | 1.5 | | 0.4 | | 0.4 |
| | Sodium persulfate | | 0.3 | | | 0.5 | | | |
| | Azobisisobutyronitrile | | | | | 0.2 | | 0.6 | |

TABLE 5

| Step | Composition (parts) | Example 1 | 2 | 3 | 4 | 5 | 6 | 7 |
|---|---|---|---|---|---|---|---|---|
| 2nd | Monomers | | | | | | | |
| | Butadiene | 30 | 30 | 20 | 20 | 45 | 45 | 32 |
| | Styrene | 45 | 39 | 30 | 45 | 20 | 5 | 15 |
| | Methyl methacrylate | 8 | 8 | 15 | 5 | 5 | 5 | 20 |
| | Acrylonitrile | | | | 5 | | 2 | |
| | Acrylamide | | | | 1 | | | |
| | 2-Hydroxyethyl acrylate | | | 3 | | | | |
| | Fumaric acid | 2 | | | | | 1 | |
| | Itaconic acid | | 1 | 1 | | | | |
| | Acrylic acid | 1 | 2 | | 2 | | 1 | 2 |
| | Methacrylic acid | 1 | | 1.5 | 1 | 3 | | |
| | Chain transfer agents | | | | | | | |
| | (1) Highly soluble chain transfer agent | | | | | | | |
| | 2-Mercaptoethanol | | | 0.3 | | | | |
| | Mercaptoacetic acid | | | | | | | |
| | 2-Mercaptopropionic acid | 0.2 | | | | | | |
| | β-Thiodiglycol | | | | | | 1 | |
| | Thiodiglycolic acid | | | | | 0.5 | | |
| | L-Cystine | | | | | | | |
| | 2,2'-Dithiosalicylic acid | | | 0.2 | | | | |
| | 3,3'-Dithiodipropionic acid | | | | | | | |
| | 2-Chloroethanol | | | | 0.8 | | | |
| | Trichloroacetic acid | | | | | | | |
| | 2-Bromopropionic acid | | | | | | | |
| | (2) Poorly soluble chain | | | | | | | |

TABLE 5-continued

| Step | Composition (parts) | Example 1 | 2 | 3 | 4 | 5 | 6 | 7 |
|---|---|---|---|---|---|---|---|---|
| | transfer agent(s) | | | | | | | |
| | Tetraethylthiuram disulfide | | | | 1 | | | |
| | α-Methylstyrene dimer | | | 1.5 | | | 1 | |
| | Carbon tetrachloride | | 4 | | | 4 | | |
| | t-Dodecylmercaptan | 0.2 | | | | 0.6 | | 0.5 |
| | n-Tetradecylmercaptan | | | | | | | |
| | t-Hexadecylmercaptan | | | | | | | |
| | n-Hexadecylmercaptan | | | | | | | |
| | Polymerization initiator(s) | | | | | | | |
| | Potassium persulfate | | | 0.5 | | | 1 | 0.5 |
| | Sodium persulfate | | 0.3 | | | | | |
| | Azobisisobutyronitrile | | | | | | | 0.2 |

TABLE 6

| Step | Composition (parts) | Example 8 | 9 | 10 | 11 | 12 | 13 | 14 |
|---|---|---|---|---|---|---|---|---|
| 2nd | Monomers | | | | | | | |
| | Butadiene | 32 | 32 | 20 | 20 | 25 | 25 | 30 |
| | Styrene | 40 | 35 | 45 | 35 | 30 | 20 | 45 |
| | Methyl methacrylate | | 5 | 8 | 5 | 10 | 10 | 8 |
| | Acrylonitrile | 2 | 2 | | | | 5 | |
| | Acrylamide | | | | | | | |
| | 2-Hydroxyethyl acrylate | | | | | 2 | | |
| | Fumaric acid | | | | | | | |
| | Itaconic acid | | | | | | 1 | |
| | Acrylic acid | 3 | 3 | 1 | 2 | 1 | | 1 |
| | Methacrylic acid | 1 | 1 | 1 | 1 | | 2 | 1 |
| | Chain transfer agents | | | | | | | |
| | (1) Highly soluble chain transfer agent | | | | | | | |
| | 2-Mercaptoethanol | 0.5 | | | | | | |
| | Mercaptoacetic acid | | | 0.4 | | | | |
| | 2-Mercaptopropionic acid | | | | | | | |
| | β-Thiodiglycol | | | | | | | |
| | Thiodiglycolic acid | | | | | | | |
| | L-Cystine | | | | 0.4 | | | |
| | 2,2'-Dithiosalicylic acid | | | | | | | |
| | 3,3'-Dithiodipropionic acid | | | 0.3 | | | | |
| | 2-Chloroethanol | | | | | | | |
| | Trichloroacetic acid | | | | 2 | | | |
| | 2-Bromopropionic acid | | | | | 1 | | |
| | (2) Poorly soluble chain transfer agent(s) | | | | | | | |
| | Tetraethylthiuram disulfide | 0.5 | | | | 2.5 | | |
| | α-Methylstyrene dimer | | 2 | | | | | 3 |
| | Carbon tetrachloride | 3 | | | 2 | | | |
| | t-Dodecylmercaptan | | 0.3 | 0.2 | | | 0.25 | |
| | n-Tetradecylmercaptan | | | | | | | |
| | t-Hexadecylmercaptan | | | | | | | |
| | n-Hexadecylmercaptan | | | | | | | |
| | Polymerization initiator(s) | | | | | | | |
| | Potassium persulfate | | | | | | | 0.3 |
| | Sodium persulfate | | | | | | 1.5 | 0.3 |
| | Azobisisobutyronitrile | 1.5 | | | | | | |

TABLE 7

| Step | Composition (parts) | Example 15 | 16 | 17 | 18 | 19 | 20 | 21 |
|---|---|---|---|---|---|---|---|---|
| 2nd | Monomers | | | | | | | |
| | Butadiene | 20 | 59 | 20 | 15 | 30 | 30 | 20 |
| | Styrene | 55 | 30 | 10 | 25 | 45 | 39 | 30 |
| | Methyl Methacrylate | 8 | 5 | 6 | | 8 | 8 | 15 |
| | Acrylonitrile | | | 2 | 5 | | 0 | 5 |
| | Acrylamide | | | | 3 | | | 1 |
| | 2-Hydroxyethyl acrylate | | 1 | | | | | 3 |
| | Fumaric acid | | | | 2 | 2 | | |
| | Itaconic acid | | | | | | 1 | 1 |
| | Acrylic acid | 1 | | 2 | | 1 | 2 | |
| | Methacrylic acid | 1 | 2.3 | | 1 | 1 | | 1.5 |
| | Chain transfer agents | | | | | | | |
| | (1) Highly soluble chain transfer agent | | | | | | | |

TABLE 7-continued

| Step | Composition (parts) | Example 15 | 16 | 17 | 18 | 19 | 20 | 21 |
|---|---|---|---|---|---|---|---|---|
| | 2-Mercaptoethanol | | | | | 0 | | |
| | Mercaptoacetic acid | | | 0.2 | | | | |
| | 2-Mercaptopropionic acid | | | | | | | |
| | β-Thiodiglycol | | | | | | | 0.5 |
| | Thiodiglycolic acid | | | | | | 0.1 | |
| | L-Cystine | | 0.5 | | | 0 | | |
| | 2,2'-Dithiosalicylic acid | 3 | | | | | | |
| | 3,3'-Dithiodipropionic acid | | | | | | | 0 |
| | 2-Chloroethanol | | | | 0.8 | | | |
| | Trichloroacetic acid | | | | | | | |
| | 2-Bromopropionic acid | | | | | | | |
| | (2) Poorly soluble chain transfer agent(s) | | | | | | | |
| | Tetraethylthiuram disulfide | | 1.5 | 2 | | | | |
| | α-Methylstyrene dimer | 1 | | 3 | | | | |
| | Carbon tetrachloride | 2 | | | 4 | | | |
| | t-Dodecylmercaptan | | 0.5 | | | | | |
| | n-Tetradecylmercaptan | | | | | | 0.5 | |
| | t-Hexadecylmercaptan | | | | | | 0.6 | |
| | n-Hexadecylmercaptan | | | | | | | 2 |
| | Polymerization initiator(s) | | | | | | | |
| | Potassium persulfat | | | | | 0 | | 0.5 |
| | Sodium persulfate | | 0.5 | 0.2 | | | 0.3 | |
| | Azobisisobutyronitrile | 0.5 | | | 0.5 | | | |

TABLE 8

| Step | Composition (parts) | Comparative Example 1 | 2 | 3 | 4 | 5 | 6 | 7 | 8 |
|---|---|---|---|---|---|---|---|---|---|
| 2nd | Monomers | | | | | | | | |
| | Butadiene | 30 | 30 | 20 | 20 | 20 | 59 | 20 | 15 |
| | Styrene | 45 | 39 | 30 | 45 | 55 | 30 | 10 | 25 |
| | Methyl methacrylate | 8 | 8 | 15 | 5 | 8 | 5 | 6 | |
| | Acrylonitrile | | | 5 | | | | 3 | 5 |
| | Acrylamide | | | 1 | | | | | 3 |
| | 2-Hydroxyethyl acrylate | | | | 3 | | 1 | | |
| | Fumaric acid | | | | | | | | 2 |
| | Itaconic acid | | 1 | 1 | | | | | |
| | Acrylic acid | 1 | 2 | | 2 | 1 | | 3 | |
| | Methacrylic acid | 1 | | 1.5 | 1 | 1 | 2.3 | | 1 |
| | Chain transfer agents | | | | | | | | |
| | (1) Highly soluble chain transfer agent | | | | | | | | |
| | 2-Mercaptoethanol | 0.3 | | | | | | 0.2 | |
| | Mercaptoacetic acid | | | | | | 0.5 | | |
| | 2-Mercaptopropionic acid | | | | 0.8 | | | | |
| | β-Thiodiglycol | | | | | | | | |
| | Thiodiglycolic acid | | 1 | | | 1 | | | |
| | L-Cystine | | | | | | | | |
| | 2,2'-Dithiosalicylic acid | | | | | | | | |
| | 3,3'-Dithiodipropionic acid | | | | | 1.5 | | | |
| | 2-Chloroethanol | | | 2.5 | | | | | |
| | Trichloroacetic acid | | | | | | 2 | | |
| | 2-Bromopropionic acid | | | | | | | | 2.5 |
| | (2) Poorly soluble chain transfer agent(s) | | | | | | | | |
| | Tetraethylthiuram disulfide | | | | | | 1 | | |
| | α-Methylstyrene dimer | | | | | | | | 1 |
| | Carbon tetrachloride | | 3 | | | | | | |
| | t-Dodecylmercaptan | 0.2 | | | | | | | |
| | n-Tetradecylmercaptan | | | | | | | | |
| | t-Hexadecylmercaptan | | | | | | | | |
| | n-Hexadecylmercaptan | | | | | | | | |
| | Polymerization initiator(s) | | | | | | | | |
| | Potassium persulfat | | | 0.5 | | | | | |
| | Sodium persulfate | | 0.3 | | | | 0.5 | 0.2 | |
| | Azobisisobutyronitrile | | | | 0.5 | | | | 0.5 |

TABLE 9

| Measurement results | Example 1 | 2 | 3 | 4 | 5 | 6 | 7 |
|---|---|---|---|---|---|---|---|
| Gel content (%) | 53 | 78 | 71 | 65 | 45 | 69 | 82 |
| Adhesive strength | 3.8 | 4.2 | 3.8 | 3.9 | 3.9 | 4.0 | 4.5 |
| Water resistance | 4.3 | 4.1 | 3.8 | 3.9 | 4.0 | 3.9 | 3.8 |
| Ink acceptability | 3.9 | 4.0 | 4.5 | 4.2 | 4.0 | 4.2 | 4.4 |

TABLE 9-continued

| Measurement results | Example 1 | 2 | 3 | 4 | 5 | 6 | 7 |
|---|---|---|---|---|---|---|---|
| Sheet gloss (%) | 67.8 | 68.3 | 69.4 | 68.9 | 67.2 | 67.5 | 68.0 |
| Blister resistance (°C.) | 550 | 510 | 500 | 520 | 540 | 500 | 490 |

TABLE 10

| Measurement results | Example 8 | 9 | 10 | 11 | 12 | 13 | 14 |
|---|---|---|---|---|---|---|---|
| Gel content (%) | 73 | 87 | 31 | 61 | 53 | 86 | 58 |
| Adhesive strength | 4.1 | 4.6 | 3.6 | 3.9 | 3.9 | 4.6 | 4.0 |
| Water resistance | 3.9 | 3.8 | 4.0 | 4.2 | 4.6 | 3.8 | 4.4 |
| Ink acceptability | 4.1 | 4.3 | 4.0 | 3.9 | 3.7 | 4.1 | 3.9 |
| Sheet gloss (%) | 67.7 | 68.4 | 67.1 | 67.5 | 68.0 | 67.9 | 68.3 |
| Blister resistance (°C.) | 510 | 49. | 510 | 510 | 540 | 500 | 520 |

TABLE 11

| Measurement results | Example 15 | 16 | 17 | 18 | 19 | 20 | 21 |
|---|---|---|---|---|---|---|---|
| Gel content (%) | 72 | 77 | 40 | 83 | 72 | 59 | 85 |
| Adhesive strength | 3.8 | 4.0 | 3.8 | 4.0 | 4.2 | 4.0 | 4.8 |
| Water resistance | 3.9 | 3.7 | 4.2 | 3.9 | 4.2 | 4.5 | 4.0 |
| Ink acceptability | 4.2 | 4.3 | 4.0 | 4.2 | 4.1 | 4.0 | 4.3 |
| Sheet gloss (%) | 69.0 | 66.8 | 68.1 | 67.0 | 67.1 | 68.0 | 67.3 |
| Blister resistance (°C.) | 500 | 490 | 520 | 480 | 500 | 530 | 480 |

TABLE 12

| Measurement results | Comparative Example 1 | 2 | 3 | 4 | 5 | 6 | 7 | 8 |
|---|---|---|---|---|---|---|---|---|
| Gel content (%) | 70 | 83 | 44 | 62 | 53 | 67 | 77 | 74 |
| Adhesive strength | 3.7 | 3.8 | 3.2 | 3.4 | 3.3 | 3.5 | 3.1 | 3.4 |
| Water resistance | 3.8 | 3.6 | 3.7 | 3.8 | 3.7 | 3.7 | 3.6 | 3.8 |
| Ink acceptability | 3.2 | 3.4 | 3.1 | 3.1 | 3.2 | 3.3 | 3.3 | 3.0 |
| Sheet gloss | 66.0 | 66.4 | 65.7 | 65.5 | 66.5 | 65.5 | 66.1 | 67.1 |
| Blister resistance (°C.) | 490 | 480 | 510 | 500 | 500 | 510 | 480 | 480 |

Example 22

A 5-liter autoclave purged with nitrogen was charged with 5 parts of 1,3-butadiene, 6 parts of styrene, 2 parts of methyl methacrylate, 2 parts of fumaric acid, 0.5 part of potassium persulfate, 100 parts of water, 0.1 part of sodium alkylbenzenesulfonate, 0.05 part of β-thiodiglycol and 0.1 part of tert-dodecylmercaptan, and the reaction was carried out at 70° C. with stirring. After 2 hours, the remaining monomers, namely 30 parts of 1,3-butadiene, 45 parts of styrene, 8 parts of methyl methacrylate, 1 part of acrylic acid and 1 part of methacrylic acid, and 0.2 part of β-thiodiglycol and 0.4 part of tert-dodecylmercaptan were charged, together with 0.5 part of sodium alkylbenzenesulfonate. When the reaction period amounted to 15 hours, a conversion of 97% or more (per 100 parts of monomers) was attained. The reaction mixture was then cooled to 30° C., and adjusted to pH 7.5±0.2 with sodium hydroxide. The unreacted monomers were eliminated from the mixture by blowing steam thereinto. The latex was further concentrated to a solid content of 50%, whereby a desired latex was obtained.

Using the latex thus obtained, a paper coating composition was prepared according to the following formulation:

| Ultra White 90 (product of Engelhard Corp., First class Kaolin) | 70 parts |
| Carbital 90 (product of ECC, ground calcium carbonate) | 30 parts |
| Aron T-40 (product of Toagosei Chemical Industry, sodium polyacrylate) | 0.1 part |
| Copolymer latex | 14 parts |
| Modified starch MS-4600 (product of Nihon Shokuhin Kako) | 3 parts |
| Water | to make a whole solid content of 60% by weight |

This paper coating composition was applied to both sides of a wood-free paper having a basis weight of 64 g/m$^2$, the coating weight being 15.0±0.5 g/m$^3$. The paper was then dried in a fan drier (120° C.) for 30 seconds. The coated paper thus obtained was allowed to stand at 23° C. and 60% RH for 24 hours and then subjected to two repetitions of super calendering at a linear pressure of 100 kg/cm and a roll temperature of 70° C. Some typical physical characteristics of the coated paper obtained were measured. The results are shown in Table 16.

Examples 23 to 29

Proceeding in the same manner as in Example 22 except that the monomer compositions and chain transfer agent combinations specified in Table 13 and Table 14 were used, latices were produced by emulsion polymerization and paper coating compositions were prepared therefrom and applied to paper to give coated papers. Typical physical properties of the coated papers obtained were measured. The results are shown in Table 16.

Comparative Examples 9 to 13

Proceeding in the same manner as in Example 22 except that the monomer compositions and chain transfer agent combinations specified in Table 15 were used, latices were produced by emulsion polymerization and paper coating compositions were prepared therefrom and applied to paper to give coated papers. Typical physical characteristics of the coated papers obtained were measured. The results are shown in Table 17.

The physical characteristics reported in Table 16 and Table 17 were measured or evaluated.

The results obtained in the examples and comparative examples clearly indicate that the coated papers obtained by using the copolymer latices of the present invention have good and balanced physical characteristics from the viewpoints of adhesive strength, water resistance, ink acceptability and sheet gloss and that when synthetically evaluated as coated papers from the physical characteristics viewpoint, they are superior.

TABLE 13

| Composition (1st step/2nd step) (parts) | Example 22 | Example 23 | Example 24 | Example 25 |
|---|---|---|---|---|
| Monomers | | | | |
| Butadiene | 5/30 | 5/20 | 10/45 | 8/32 |
| Styrene | 6/45 | 10/45 | 10/20 | 10/40 |
| Methyl methacrylate | 2/8 | 10/5 | 5/5 | |
| Acrylonitrile | | | | 1/2 |
| Acrylamide | | | | |
| 2-Hydroxyethyl acrylate | | | 1/0 | |
| Fumaric acid | 2/0 | | | 2/0 |
| Itaconic acid | | | 1/0 | |
| Acrylic acid | 0/1 | 1/2 | | 0/3 |
| Methacrylic acid | 0/1 | 1/1 | 0/3 | 1/1 |
| Chain transfer agent(s) | | | | |
| β-Thiodiglycol | 0.05/0.2 | | 0.02/0.2 | |
| Thiodiglycolic acid | | | | |
| 3,3'-Thiodipropionic acid | | | | |
| Dithiodiglycolic acid | | | | |
| L-Cystine | | | | |
| 2,2'-Dithiosalicylic acid | | 0.1/0.5 | | |
| 3,3'-Dithiodipropionic acid | | | 0.05/0.2 | 0/1.5 |
| 4,4'-Dithiodibutyric acid | | | | |
| Carbon tetrachloride | | 0.05/0.08 | 0/0.5 | 0.3/0.1 |
| t-Dodecylmercaptan | 0.1/0.4 | | | |
| Polymerization initiator(s) | | | | |
| Potassium persulfate | 0.5/0 | 1.5/0 | 1/0 | |
| Sodium persulfate | | | | |
| Azobisisobutyronitrile | | | | 0.5/1.5 |

TABLE 14

| Composition (1st step/2nd step) (parts) | Example 26 | Example 27 | Example 28 | Example 29 |
|---|---|---|---|---|
| Monomers | | | | |
| Butadiene | 15/20 | 15/25 | 5/30 | 5/20 |
| Styrene | 10/35 | 10/30 | 6/45 | 6/55 |
| Methyl methacrylate | 10/5 | 5/10 | 2/8 | 2/8 |
| Acrylonitrile | | | | |
| Acrylamide | | | | |
| 2-Hydroxyethyl acrylate | | 0/2 | | |
| Fumaric acid | | 1/0 | 2/0 | 2/0 |
| Itaconic acid | | | | |
| Acrylic acid | 1/2 | 1/1 | 0/1 | 0/1 |
| Methacrylic acid | 1/1 | | 0/1 | 0/1 |
| Chain transfer agent(s) | | | | |
| 2-Mercaptoethanol | | | | |
| β-Thiodiglycol | | | 0.05/1.5 | |
| Thiodiglycolic acid | | | | |
| 3,3'-Thiodipropionic acid | 0.4/1 | 0.1/0.2 | | |
| Dithiodiglycolic acid | | | | |
| L-Cystine | | | | |
| 2,2'-Dithiosalicylic acid | | | | |
| 3,3'-Dithiodipropionic acid | | | | 0.05/0.2 |
| 4,4'-Dithiodibutyric acid | | 0.5/1.5 | | |
| Carbon tetrachloride | 0.5/2 | 3/0 | | |
| t-Dodecylmercaptan | 0.1/0.5 | 0.2/1 | 0/0.6 | 0.1/0.5 |
| Polymerization initiator(s) | | | | |
| Potassium persulfate | | | 0.2/0.3 | |
| Sodium persulfate | 1.5/0 | 1.5/0 | 0.2/0.3 | 0.5/0 |
| Azobisisobutyronitrile | | | | 0.2/0.5 |

TABLE 15

| Composition (1st step/2nd step) (parts) | Comparative Example 9 | Comparative Example 10 | Comparative Example 11 | Comparative Example 12 | Comparative Example 13 |
|---|---|---|---|---|---|
| Monomers | | | | | |
| Butadiene | 5/30 | 5/30 | 10/45 | 8/32 | 5/20 |
| Styrene | 6/45 | 6/39 | 10/20 | 10/40 | 6/55 |
| Methyl methacrylate | 2/8 | 2/8 | 5/5 | | 2/8 |
| Acrylonitrile | | 5/10 | | 1/2 | |
| Acrylamide | | | | | |
| 2-Hydroxyethyl acrylate | | 1/0 | | | |
| Fumaric acid | 2/0 | | | 2/0 | 2/0 |
| Itaconic acid | | 2/1 | 1/0 | | |
| Acrylic acid | 0/1 | 0/2 | | 0/3 | 0/1 |
| Methacrylic acid | 0/1 | | 0/3 | 1/1 | 0/1 |
| Chain transfer agent(s) | | | | | |
| 2-Mercaptoethanol | | | | | |
| β-Thiodiglycol | | | | | |
| Thiodiglycolic acid | | | | | |
| 3,3'-Thiodipropionic acid | | | | | |
| Dithiodiglycolic acid | | | | | |
| L-Cystine | | | | | |
| 2,2'-Dithiosalicylic acid | | | | | |
| 3,3'-Dithiodipropionic acid | | | | | |
| 4,4'-Dithiodibutyric acid | | | | | |
| Carbon tetrachloride | 2/4 | 1/2.5 | | 1/3.5 | 3/0 |
| t-Dodecylmercaptan | | 0.1/0.2 | 0.5/2.5 | 0/0.3 | 0/1.2 |
| Polymerization initiator(s) | | | | | |
| Potassium persulfate | 0.5/0 | | 1/0 | | |
| Sodium persulfate | | 0.3/0.3 | | | 0.5/0 |
| Azobisisobutyronitrile | | | | 0.5/1.5 | 0.2/0.5 |

TABLE 16

| Measurement results | Ex. 22 | Ex. 23 | Ex. 24 | Ex. 25 | Ex. 26 | Ex. 27 | Ex. 28 | Ex. 29 |
|---|---|---|---|---|---|---|---|---|
| Gel content (%) | 71 | 60 | 45 | 57 | 54 | 49 | 64 | 73 |
| Adhesive strength | 4.2 | 3.5 | 3.6 | 4.0 | 3.8 | 4.1 | 4.4 | 3.9 |
| Water resistance | 4.3 | 4.2 | 3.9 | 4.2 | 4.4 | 4.6 | 4.4 | 3.9 |
| Ink acceptability | 4.0 | 4.1 | 3.8 | 3.9 | 3.9 | 3.8 | 4.0 | 4.5 |
| Sheet gloss (%) | 66.9 | 68.0 | 66.2 | 67.1 | 66.7 | 66.6 | 67.5 | 69.2 |
| Blister resistance (°C.) | 510 | 530 | 530 | 520 | 550 | 550 | 530 | 500 |

TABLE 17

| Measurement results | Comp. Ex. 9 | Comp. Ex. 10 | Comp. Ex. 11 | Comp. Ex. 12 | Comp. Ex. 13 |
|---|---|---|---|---|---|
| Gel content (%) | 76 | 72 | 47 | 66 | 58 |
| Adhesive strength | 3.7 | 3.5 | 3.1 | 3.5 | 3.3 |
| Water resistance | 3.8 | 3.9 | 4.0 | 3.9 | 4.0 |
| Ink acceptability | 3.3 | 3.3 | 3.0 | 3.5 | 3.2 |
| Sheet gloss (%) | 65.8 | 66.0 | 65.3 | 64.7 | 67.2 |
| Blister resistance (°C.) | 490 | 480 | 490 | 520 | 510 |

Example 30

A 5-liter autoclave purged with nitrogen was charged with 5 parts of 1,3-butadiene, 6 parts of styrene, 2 parts of methyl methacrylate, 2 parts of fumaric acid, 0.5 part of potassium persulfate, 100 parts of water, 0.1 part of sodium alkylbenzenesulfonate, 0.05 part of β-thiodiglycol and 0.1 part of tert-dodecylmercaptan, and the reaction was carried out at 70° C. with stirring. After 2 hours, the remaining monomers, namely 30 parts of 1,3-butadiene, 45 parts of styrene, 8 parts of methyl methacrylate, 1 part of acrylic acid and 1 part of methacrylic acid, and 0.2 part of β-thiodiglycol and 0.4 part of tert-dodecylmercaptan were charged, together with 0.5 part of sodium alkylbenzenesulfonate. When the reaction period amounted to 15 hours, a conversion of 97% or more (per 100 parts of monomers) was attained. The reaction mixture was then cooled to 30° C., and adjusted to pH 7.5±0.2 with sodium hydroxide. The unreacted monomers were eliminated from the mixture by blowing steam thereinto. The latex was further concentrated to a solid content of 50%, whereby a desired latex was obtained.

Using the latex thus obtained, a paper coating composition was prepared according to the following formulation:

| | |
|---|---|
| Ultra White 90 (product of Engelhard Corp., First class Kaolin) | 70 parts |
| Carbital 90 (product of ECC, ground calcium carbonate) | 30 parts |
| Aron T-40 (product of Toagosei Chemical Industry, sodium polyacrylate) | 0.1 part |
| Copolymer latex | 14 parts |
| Modified starch MS-4600 (product of Nihon Shokuhin Kako) | 3 parts |
| Water | to make a whole solid content of 60% by weight |

This paper coating composition was applied to both sides of a wood-free paper having a basis weight of 64 g/m$^2$, the coating weight being 15.0±0.5 g/m$^3$. The paper was then dried in a fan drier (120° C.) for 30 seconds. The coated paper thus obtained was allowed to stand at 23° C. and 60% RH for 24 hours and then subjected to two repetitions of super calendering at a linear pressure of 100 kg/cm and a roll temperature of 70° C. Some typical physical characteristics of the coated paper obtained were measured. The results are shown in Table 20.

Examples 31 to 44

Proceeding in the same manner as in Example 30 except that the monomer compositions and chain transfer agent combinations specified in Table 18 and Table 19 were used, latices were produced by emulsion polymerization and paper coating compositions were prepared therefrom and applied to paper to give coated papers. Typical physical properties of the coated papers obtained were measured. The results are shown in Table 20 and Table 21.

Comparative Examples 14 to 18

Proceeding in the same manner as in Example 30 except that the monomer compositions and chain transfer agent combinations specified in Table 19 were used, latices were produced by emulsion polymerization and paper coating compositions were prepared therefrom and applied to paper to give coated papers. Typical physical characteristics of the coated papers obtained were measured. The results are shown in Table 21.

The physical characteristics reported in Table 20 and Table 21 were measured or evaluated by the aforementioned methods.

The results obtained in the examples and comparative examples clearly indicate that the coated papers obtained by using the copolymer latices of the present invention have good and balanced physical characteristics from the viewpoints of adhesive strength, water resistance, ink acceptability and sheet gloss and that when synthetically evaluated as coated papers from the physical characteristics viewpoint, they are superior.

TABLE 18

| Composition | Example | | | | | | | | | |
|---|---|---|---|---|---|---|---|---|---|---|
| (1st step/2nd step) (parts) | 30 | 31 | 32 | 33 | 34 | 35 | 36 | 37 | 38 | 39 |
| Monomers | | | | | | | | | | |
| Butadiene | 5/30 | 5/30 | 5/20 | 5/20 | 10/45 | 10/45 | 8/32 | 8/32 | 8/32 | 15/20 |
| Styrene | 6/45 | 6/39 | 8/30 | 10/45 | 10/20 | 20/5 | 10/15 | 10/40 | 10/35 | 6/45 |
| Methyl methacrylate | 2/8 | 2/8 | 5/15 | 10/5 | 5/5 | 2/5 | 10/20 | | 0/5 | 2/8 |
| Acrylonitrile | | 5/0 | 2.5/5 | | | 5/2 | | 1/2 | 1/2 | |
| Acrylamide | | | 2/1 | | | | 1/0 | | | |
| 2-Hydroxyethyl acrylate | | | 0/3 | | 1/0 | | | | | |
| Fumaric acid | 2/0 | | | | | 3/1 | | 2/0 | 2/0 | 2/0 |
| Itaconic acid | | 2/1 | 1/1 | | 1/0 | | 2/0 | | | |
| Acrylic acid | 0/1 | 0/2 | | 1/2 | | 1/1 | 0/2 | 0/3 | 0/3 | 0/1 |
| Methacrylic acid | 0/1 | | 0/1.5 | 1/1 | 0/3 | | | 1/1 | 1/1 | 0/1 |
| Chain transfer agent(s) | | | | | | | | | | |
| 2-Mercaptopropionic acid | | | | | | | | | | 0.2/0 |
| 2-Mercaptoethanol | | | | | | | | | | |
| β-Thiodiglycol | | | | | | | | | | |
| Dithiodiglycolic acid | | | | | | | | | | |
| 2-Mercaptoethyl octanoate | 0.2/2.0 | 0.8/2.5 | 0.2/1.5 | 0.1/1.0 | 0.4/2.0 | 2.0/0.5 | 0.5/1.5 | 1.5/1.5 | 1.7/0.4 | 0/2.0 |
| Carbon tetrachloride | | | | | 1.0/2.0 | | 0.5/2.5 | 3.0/0.5 | | |
| t-Dodecylmercaptan | | | 0.7/0.8 | | | 0.5/1.5 | 0.2/0.9 | | | |
| Polymerization initiator(s) | | | | | | | | | | |
| Potassium persulfate | 0.5/0 | | 0.2/0.5 | 1.5/0 | 1/0 | 0.5/1 | 0.2/0.5 | | 1.5/0 | 1.5/0 |
| Sodium persulfate | | 0.3/0.3 | | | | | | | | |
| Azobisisobutyronitrile | | | | | | | 0.2/0.2 | 0.5/1.5 | | |

TABLE 19

| Composition | Example | | | | | Comparative Example | | | | |
|---|---|---|---|---|---|---|---|---|---|---|
| (1st step/2nd step) (parts) | 40 | 41 | 42 | 43 | 44 | 14 | 15 | 16 | 17 | 18 |
| Monomers | | | | | | | | | | |
| Butadiene | 15/20 | 15/25 | 15/25 | 5/30 | 5/20 | 5/30 | 5/30 | 10/45 | 8/32 | 5/20 |
| Styrene | 10/35 | 10/30 | 10/20 | 6/45 | 6/55 | 6/45 | 6/39 | 10/20 | 10/40 | 6/55 |
| Methyl methacrylate | 10/5 | 5/10 | 5/10 | 2/8 | 2/8 | 2/8 | 2/8 | 5/5 | | 2/8 |
| Acrylonitrile | | | 5/5 | | | | 5/10 | | 1/2 | |

TABLE 19-continued

| Composition (1st step/2nd step) (parts) | Example 40 | 41 | 42 | 43 | 44 | Comparative Example 14 | 15 | 16 | 17 | 18 |
|---|---|---|---|---|---|---|---|---|---|---|
| Acrylamide | | | | | | | | | | |
| 2-Hydroxyethyl acrylate | | 0/2 | | | | | | 1/0 | | |
| Fumaric acid | | 1/0 | 1/0 | 2/0 | 2/0 | 2/0 | | | 2/0 | 2/0 |
| Itaconic acid | | | 1/1 | | | | 2/1 | 1/0 | | |
| Acrylic acid | 1/2 | 1/1 | | 0/1 | 0/1 | 0/1 | 0/2 | | 0/3 | 0/1 |
| Methacrylic acid | 1/1 | | 0/2 | 0/1 | 0/1 | 0/1 | | 0/3 | 1/1 | 0/1 |
| Chain transfer agent(s) | | | | | | | | | | |
| 2-Mercaptopropionic acid | | | | | 0.1/0.1 | | | | | |
| 2-Mercaptoethanol | 0.3/0.1 | | | 0.15/0 | | | | | | |
| β-Thiodiglycol | | 0.2/0 | | | 0.15/0.2 | | | | 0.1/0.4 | |
| Dithiodiglycolic acid | | | 0.5/0.5 | 0.2/0.3 | | | | | | 0.2/0.1 |
| 2-Mercaptoethyl octanoate | 0.3/1.0 | 0.3/0.5 | 0.4/1.5 | 0.3/0.8 | 0.1/2.5 | | | | | |
| Carbon tetrachloride | | | 0.5/1.5 | 0.5/2 | | 2/3.5 | | 2.5/1 | | 2.0/2.0 |
| t-Dodecylmercaptan | | 0/1.5 | | 0.1/0.8 | | | 0.3/2.0 | 0.4/1.3 | 0.5/0.8 | 0.2/0.5 |
| Polymerization initiator(s) | | | | | | | | | | |
| Potassium persulfate | | | | 0.2/0.3 | | 0.5/0 | | 1/0 | | |
| Sodium persulfate | 1.5/0 | 1.5/0 | 0.5/1.5 | 0.2/0.3 | 0.5/0 | | 0.3/0.3 | | | 0.5/0 |
| Azobisisobutyronitrile | | | | | 0.2/0.5 | | | | 0.5/1.5 | 0.2/0.5 |

TABLE 20

| Measurement results | Example 30 | 31 | 32 | 33 | 34 | 35 | 36 | 37 | 38 | 39 |
|---|---|---|---|---|---|---|---|---|---|---|
| Gel content (%) | 75 | 59 | 64 | 83 | 53 | 35 | 47 | 42 | 69 | 79 |
| Adhesive strength | 4.1 | 3.5 | 3.8 | 4.4 | 3.3 | 3.1 | 3.1 | 3.1 | 3.8 | 4.2 |
| Water resistance | 3.6 | 4.1 | 4.0 | 3.4 | 4.4 | 4.0 | 4.3 | 4.2 | 3.9 | 3.5 |
| Ink acceptability | 4.2 | 3.7 | 3.9 | 4.3 | 3.7 | 3.9 | 3.7 | 3.7 | 4.0 | 4.2 |
| Sheet gloss (%) | 67.2 | 69.0 | 69.1 | 67.5 | 68.5 | 69.7 | 69.5 | 68.8 | 69.3 | 67.9 |
| Blister resistance (°C.) | 500 | 540 | 530 | 490 | 540 | 560 | 540 | 550 | 500 | 500 |

TABLE 21

| Measurement results | Example 40 | 41 | 42 | 43 | 44 | Comparative Example 14 | 15 | 16 | 17 | 18 |
|---|---|---|---|---|---|---|---|---|---|---|
| Gel content (%) | 86 | 71 | 56 | 40 | 66 | 74 | 68 | 52 | 81 | 63 |
| Adhesive strength | 4.6 | 4.0 | 3.5 | 3.2 | 3.8 | 3.2 | 2.9 | 2.5 | 3.4 | 2.6 |
| Water resistance | 3.3 | 3.9 | 4.6 | 4.2 | 3.9 | 3.0 | 3.2 | 3.2 | 2.8 | 3.4 |
| Ink acceptability | 4.5 | 4.2 | 3.7 | 3.8 | 3.9 | 3.5 | 3.5 | 3.0 | 3.7 | 3.3 |
| Sheet gloss (%) | 68.1 | 67.5 | 68.4 | 69.3 | 68.7 | 66.5 | 67.2 | 67.8 | 66.1 | 67.5 |
| Blister resistance (°C.) | 480 | 510 | 520 | 540 | 520 | 480 | 500 | 520 | 470 | 520 |

Example 45

A 5-liter autoclave purged with nitrogen was charged with 5 parts of 1,3-butadiene, 6 parts of styrene, 2 parts of methyl methacrylate, 2 parts of fumaric acid, 0.5 part of potassium persulfate, 100 parts of water, 0.1 part of sodium alkylbenzenesulfonate and 0.2 part of methoxybutyl mercaptoacetate, and the reaction was carried out at 70° C. with stirring. After 2 hours, the remaining monomers, namely 30 parts of 1,3-butadiene, 45 parts of styrene, 8 parts of methyl methacrylate, 1 part of acrylic acid and 1 part of methacrylic acid, and 0.5 part of methoxybutyl mercaptoacetate were charged, together with 0.5 part of sodium alkylbenzenesulfonate. When the reaction period amounted to 15 hours, a conversion of 97% or more (per 100 parts of monomers) was attained. The reaction mixture was then cooled to 30° C., and adjusted to pH 7.5±0.2 with sodium hydroxide. The unreacted monomers were eliminated from the mixture by blowing steam thereinto. The latex was further concentrated to a solid content of 50%, whereby a desired latex was obtained.

Using the latex thus obtained, a paper coating composition was prepared according to the following formulation:

| | |
|---|---|
| Ultra White 90 (product of Engelhard Corp., First class Kaolin) | 70 parts |
| Carbital 90 (product of ECC, ground calcium carbonate) | 30 parts |
| Aron T-40 (product of Toagosei Chemical Industry, sodium polyacrylate) | 0.1 part |
| Copolymer latex | 14 parts |
| Modified starch MS-4600 (product of Nihon Shokuhin Kako) | 3 parts |
| Water | to make a whole solid content of 60% by weight |

This paper coating composition was applied to both sides of a wood-free paper having a basis weight of 64 g/m², the coating weight being 15.0±0.5 g/m³. The paper was then dried in a fan drier (120° C.) for 30 seconds. The coated paper thus obtained was allowed to stand at 23° C. and 60% RH for 24 hours and then subjected to two repetitions of super calendering at a linear pressure of 100 kg/cm and a roll temperature of 70° C. Some typical physical characteristics of the coated paper obtained were measured. The results are shown in Table 24.

Examples 46 to 59

Proceeding in the same manner as in Example 45 except that the monomer compositions and chain transfer agent combinations specified in Table 22 and Table 23 were used, latices were produced by emulsion polymerization and paper coating compositions were prepared therefrom and applied to paper to give coated papers. Typical physical properties of the coated papers obtained were measured. The results are shown in Table 24 and Table 25.

Comparative Examples 19 to 23

Proceeding in the same manner as in Example 45 except that the monomer compositions and chain transfer agent combinations specified in Table 23 were used, latices were produced by emulsion polymerization and paper coating compositions were prepared therefrom and applied to paper to give coated papers. Typical physical characteristics of the coated papers obtained were measured. The results are shown in Table 25.

The physical characteristics reported in Table 24 and Table 25 were measured or evaluated by the aforementioned method.

The results obtained in the examples and comparative examples clearly indicate that the coated papers obtained by using the copolymer latices of the present invention have good and balanced physical characteristics from the viewpoints of adhesive strength, water resistance, ink acceptability and sheet gloss and that when synthetically evaluated as coated papers from the physical characteristics viewpoint, they are superior.

TABLE 22

| Composition (1st step/2nd step) (parts) | Example | | | | | | | | | |
|---|---|---|---|---|---|---|---|---|---|---|
| | 45 | 46 | 47 | 48 | 49 | 50 | 51 | 52 | 53 | 54 |
| Monomers | | | | | | | | | | |
| Butadiene | 5/30 | 5/30 | 5/20 | 5/20 | 10/45 | 10/45 | 8/32 | 8/32 | 8/32 | 15/20 |
| Styrene | 6/45 | 6/39 | 8/30 | 10 | 10/20 | 20/5 | 10/15 | 10/40 | 10/35 | 6/45 |
| Methyl methacrylate | 2/8 | 2/8 | 5/15 | 45 | 5/5 | 2/5 | 10/20 | | 0/5 | 2/8 |
| Acrylonitrile | | 5/0 | 2.5/5 | 10/5 | | 5/2 | | 1/2 | 1/2 | |
| Acrylamide | | | 2/1 | | | | 1/0 | | | |
| 2-Hydroxyethyl acrylate | | | 0/3 | | 1/0 | | | | | |
| Fumaric acid | 2/0 | | | | | 3/1 | | 2/0 | 2/0 | 2/0 |
| Itaconic acid | | 2/1 | 1/1 | | 1/0 | | 2/0 | | | |
| Acrylic acid | 0/1 | 0/2 | | 1/2 | | 1/1 | 0/2 | 0/3 | 0/3 | 0/1 |
| Methacrylic acid | 0/1 | | 0/1.5 | 1/1 | 0/3 | | | 1/1 | 1/1 | 0/1 |
| Chain transfer agent(s) | | | | | | | | | | |
| 2-Mercaptopropionic acid | | | | | | | | | | |
| 2-Mercaptoethanol | | | | | | | | | | |
| 3,3'-Thiodipropionic acid | | | | | | | | | | |
| L-Cystine | | | | | | | | | | |
| Methoxybutyl mercaptoacetate | 0.2/0.5 | 0.2/0 | 0.5/0.1 | 0.1/1.0 | 0.4/2.5 | | | | | |
| Methoxybutyl mercaptopropionate | | | | | | | 0.1/0.6 | 0.4/0.7 | 0.2/0.2 | 0.5/0 | 0/0.7 |
| Carbon tetrachloride | | 0.5/3 | | | 0.8/0 | | 1/0 | | 0/4 | |
| t-Dodecylmercaptan | | | 0/0.6 | 0.3/0.7 | 0/0.5 | | | 0.1/0.1 | | 0.2/0.1 |
| Polymerization initiator(s) | | | | | | | | | | |
| Potassium persulfate | 0.5/0 | | 0.2/0.5 | 1.5/0 | 1/0 | 0.5/1 | 0.2/0.5 | | 1.5/0 | 1.5/0 |
| Sodium persulfate | | 0.3/0.3 | | | | | | | | |
| Azobisisobutyronitrile | | | | | | | 0.2/0.2 | 0.5/1.5 | | |

TABLE 23

| Composition (1st step/2nd step) (parts) | Example | | | | | Comparative Example | | | | |
|---|---|---|---|---|---|---|---|---|---|---|
| | 55 | 56 | 57 | 58 | 59 | 19 | 20 | 21 | 22 | 23 |
| Monomers | | | | | | | | | | |
| Butadiene | 15/20 | 15/25 | 15/25 | 5/30 | 5/20 | 5/30 | 5/30 | 10/45 | 8/32 | 5/20 |
| Styrene | 10/35 | 10/30 | 10/20 | 6/45 | 6/55 | 6/45 | 6/39 | 10/20 | 10/40 | 6/55 |
| Methyl methacrylate | 10/5 | 5/10 | 5/10 | 2/8 | 2/8 | 2/8 | 2/8 | 5/5 | | 2/8 |
| Acrylonitrile | | | 5/5 | | | | 5/10 | | 1/2 | |
| Acrylamide | | | | | | | | | | |
| 2-Hydroxyethyl acrylate | | 0/2 | | | | | 1/0 | | | |
| Fumaric acid | | 1/0 | 1/0 | 2/0 | 2/0 | 2/0 | | | 2/0 | 2/0 |
| Itaconic acid | | | 1/1 | | | | 2/1 | 1/0 | | |
| Acrylic acid | 1/2 | 1/1 | | 0/1 | 0/1 | 0/1 | 0/2 | | 0/3 | 0/1 |
| Methacrylic acid | 1/1 | | 0/2 | 0/1 | 0/1 | 0/1 | | 0/3 | 1/1 | 0/1 |
| Chain transfer agent(s) | | | | | | | | | | |
| 2-Mercaptopropionic acid | 0.2/0 | | | | 0.2/0.2 | | | | | |
| 2-Mercaptoethanol | | 0.1 | 0.15/0 | | | | | | | |
| 3,3'-Thiodipropionic acid | | | 0.2/1.0 | | | | | | | |
| L-Cystine | | | | 0.3/0 | | | | | 0.2/0.3 | |
| Methoxybutyl mercaptoacetate | 0/0.7 | 0.1/0.5 | 0.2/1.0 | | | | | | | 0.4/0.1 |
| Methoxybutyl mercaptopropionate | | | | 0.2/1.5 | 0.5/0.5 | | | | | |
| Carbon tetrachloride | | | 0/3.0 | | | | 1/4 | 0.7/3.2 | 1/2 | 0.2/3 |
| t-Dodecylmercaptan | | 0/0.5 | | | 0/0.8 | 0.15/0.6 | | 0.2/0.7 | 0.5/0.8 | |
| Polymerization initiator(s) | | | | | | | | | | |
| Potassium persulfate | | | | 0.2/0.3 | | 0.5/0 | | 1/0 | | |
| Sodium persulfate | 1.5/0 | 1.5/0 | 0.5/1.5 | 0.2/0.3 | 0.5/0 | | 0.3/0.3 | | | 0.5/0 |

TABLE 23-continued

| Composition | Example | | | | | Comparative Example | | | | |
|---|---|---|---|---|---|---|---|---|---|---|
| (1st step/2nd step) (parts) | 55 | 56 | 57 | 58 | 59 | 19 | 20 | 21 | 22 | 23 |
| Azobisisobutyronitrile | | | | | 0.2/0.5 | | | | 0.5/1.5 | 0.2/0.5 |

TABLE 24

| Measurement results | Example | | | | | | | | | |
|---|---|---|---|---|---|---|---|---|---|---|
| | 45 | 46 | 47 | 48 | 49 | 50 | 51 | 52 | 53 | 54 |
| Gel content (%) | 86 | 74 | 68 | 57 | 43 | 84 | 71 | 66 | 74 | 78 |
| Adhesive strength | 4.6 | 4.0 | 3.7 | 3.5 | 3.1 | 4.6 | 4.1 | 3.6 | 4.2 | 4.3 |
| Water resistance | 3.8 | 4.1 | 4.5 | 4.6 | 4.4 | 3.7 | 4.0 | 4.4 | 4.0 | 3.9 |
| Ink acceptability | 4.4 | 4.1 | 4.0 | 3.8 | 3.6 | 4.3 | 4.1 | 4.0 | 4.1 | 4.4 |
| Sheet gloss (%) | 68.2 | 69.0 | 68.9 | 70.1 | 69.5 | 68.5 | 68.5 | 69.7 | 69.1 | 69.9 |
| Blister resistance (°C.) | 500 | 520 | 530 | 550 | 560 | 510 | 510 | 520 | 520 | 500 |

TABLE 25

| Measurement results | Example | | | | | Comparative Example | | | | |
|---|---|---|---|---|---|---|---|---|---|---|
| | 55 | 56 | 57 | 58 | 59 | 19 | 20 | 21 | 22 | 23 |
| Gel content (%) | 83 | 75 | 58 | 69 | 63 | 72 | 83 | 44 | 59 | 67 |
| Adhesive strength | 4.5 | 4.1 | 3.6 | 3.9 | 3.7 | 3.1 | 3.5 | 2.4 | 2.8 | 3.0 |
| Water resistance | 3.8 | 4.2 | 4.6 | 4.3 | 4.3 | 3.4 | 3.0 | 3.5 | 3.8 | 3.7 |
| Ink acceptability | 4.5 | 4.3 | 4.1 | 4.0 | 4.0 | 3.5 | 3.7 | 3.0 | 3.1 | 3.3 |
| Sheet gloss (%) | 67.8 | 68.3 | 70.3 | 69.4 | 69.0 | 67.5 | 67.1 | 68.5 | 68.0 | 68.1 |
| Blister resistance (°C.) | 490 | 510 | 550 | 520 | 530 | 500 | 470 | 540 | 530 | 510 |

Example 60

A 5-liter autoclave purged with nitrogen was charged with 5 parts of 1,3-butadiene, 6 parts of styrene, 2 parts of methyl methacrylate, 2 parts of fumaric acid, 0.5 part of potassium persulfate, 100 parts of water, 0.1 part of sodium alkylbenzenesulfonate, 0.1 part of diallyl sulfide and 0.1 part of tert-dodecylmercaptan, and the reaction was carried out at 70° C. with stirring. After 2 hours, the remaining monomers, namely 30 parts of 1,3-butadiene, 45 parts of styrene, 8 parts of methyl methacrylate, 1 part of acrylic acid and 1 part of methacrylic acid, and 0.2 part of β-thioglycol and 0.4 part of tert-dodecylmercaptan were charged, together with 0.5 part of sodium alkylbenzenesulfonate. When the reaction period amounted to 15 hours, a conversion of 97% or more (per 100 parts of monomers) was attained. The reaction mixture was then cooled to 30° C., and adjusted to pH 7.5±0.2 with sodium hydroxide. The unreacted monomers were eliminated from the mixture by blowing steam thereinto. The latex was further concentrated to a solid content of 50%, whereby a desired latex was obtained.

Using the latex thus obtained, a paper coating composition was prepared according to the following formulation:

| | |
|---|---|
| Ultra White 90 (product of Engelhard Corp., First class Kaolin) | 70 parts |
| Carbital 90 (product of ECC, ground calcium carbonate) | 30 parts |
| Aron T-40 (product of Toagosei Chemical Industry, sodium polyacrylate) | 0.1 part |
| Copolymer latex | 14 parts |
| Modified starch MS-4600 (product of Nihon Shokuhin Kako) | 3 parts |
| Water | to make a whole solid content of 60% by weight |

This paper coating composition was applied to both sides of a wood-free paper having a basis weight of 64 g/m², the coating weight being 15.0±0.5 g/m³. The paper was then dried in a fan drier (120° C.) for 30 seconds. The coated paper thus obtained was allowed to stand at 23° C. and 60% RH for 24 hours and then subjected to two repetitions of super calendering at a linear pressure of 100 kg/cm and a roll temperature of 70° C. Some typical physical characteristics of the coated paper obtained were measured. The results are shown in Table 28.

Examples 61 to 74

Proceeding in the same manner as in Example 60 except that the monomer compositions and chain transfer agent combinations specified in Table 26 and Table 27 were used, latices were produced by emulsion polymerization and paper coating compositions were prepared therefrom and applied to paper to give coated papers. Typical physical properties of the coated papers obtained were measured. The results are shown in Table 28 and Table 29.

Comparative Examples 24 to 28

Proceeding in the same manner as in Example 60 except that the monomer compositions and chain transfer agent combinations specified in Table 27 were used, latices were produced by emulsion polymerization and paper coating compositions were prepared therefrom and applied to paper to give coated papers. Typical physical characteristics of the coated papers obtained were measured. The results are shown in Table 29.

The physical characteristics reported in Table 28 and Table 29 were measured or evaluated.

The results obtained in the examples and comparative examples clearly indicate that the coated papers obtained by using the copolymer latices of the present invention have good and balanced physical characteristics from the viewpoints of adhesive strength, water resistance, ink acceptability and sheet gloss and that when synthetically evaluated as coated papers from the physical characteristics viewpoint, they are superior.

TABLE 26

| Composition | Example | | | | | | | | | |
|---|---|---|---|---|---|---|---|---|---|---|
| (1st step/2nd step) (parts) | 60 | 61 | 62 | 63 | 64 | 65 | 66 | 67 | 68 | 69 |
| Monomers | | | | | | | | | | |
| Butadiene | 5/30 | 5/30 | 5/20 | 5/20 | 10/45 | 10/45 | 8/32 | 8/32 | 8/32 | 15/20 |
| Styrene | 6/45 | 6/39 | 8/30 | 10/45 | 10/20 | 20/5 | 10/15 | 10/40 | 10/35 | 6/45 |
| Methyl methacrylate | 2/8 | 2/8 | 5/15 | 10/5 | 5/5 | 2/5 | 10/20 | | 0/5 | 2/8 |
| Acrylonitrile | | 5/0 | 2.5/5 | | | 5/2 | | 1/2 | 1/2 | |
| Acrylamide | | | 2/1 | | | | 1/0 | | | |
| 2-Hydroxyethyl acrylate | | | 0/3 | | 1/0 | | | | | |
| Fumaric acid | 2/0 | | | | | 3/1 | | 2/0 | 2/0 | 2/0 |
| Itaconic acid | | 2/1 | 1/1 | | 1/0 | | 2/0 | | | |
| Acrylic acid | 0/1 | 0/2 | | 1/2 | | 1/1 | 0/2 | 0/3 | 0/3 | 0/1 |
| Methacrylic acid | 0/1 | | 0/1.5 | 1/1 | 0/3 | | | 1/1 | 1/1 | 0/1 |
| Chain transfer agent(s) | | | | | | | | | | |
| 2-Mercaptopropionic acid | | | | | | | | | | |
| a-Thiodiglycol | | | | | | | | | | |
| 3,3'-Thiodipropionic acid | | | | | | | | | | |
| Dithiodiglycolic acid | | | | | | | | | | |
| Diallyl sulfide | 0.1/0.6 | 0.05/0.5 | 0.15/1.0 | 0.5/0.0 | 0/1.5 | | | 0.1/1.2 | | |
| Diallyl disulfide | | | | | | 0.4/0.8 | 0.2/1.5 | 0.7/0 | 0.2/0 | 0.3/1.2 |
| Carbon tetrachloride | | | 0.5/3.0 | | 0.7/0 | | | | 0/40.9/0.5 | 0.5/2.5 |
| t-Dodecylmercaptan | | 0.15/0.5 | | 0.1/1.5 | 0.15/0.8 | | | | | 0.1/0.4 |
| Polymerization initiator(s) | | | | | | | | | | |
| Potassium persulfate | 0.5/0 | | 0.2/0.5 | 1.5/0 | 1/0 | 0.5/1 | 0.2/0.5 | | 1.5/0 | 1.5/0 |
| Sodium persulfate | | 0.3/0.3 | | | | | | | | |
| Azobisisobutyronitrile | | | | | | | | 0.2/0.2 | 0.5/1.5 | |

TABLE 27

| Composition | Example | | | | | Comparative Example | | | | |
|---|---|---|---|---|---|---|---|---|---|---|
| (1st step/2nd step) (parts) | 70 | 71 | 72 | 73 | 74 | 24 | 25 | 26 | 27 | 28 |
| Monomers | | | | | | | | | | |
| Butadiene | 15/20 | 15/25 | 15/25 | 5/30 | 5/20 | 5/30 | 5/30 | 10/45 | 8/32 | 5/20 |
| Styrene | 10/35 | 10/30 | 10/20 | 6/45 | 6/55 | 6/45 | 6/39 | 10/20 | 10/40 | 6/55 |
| Methyl methacrylate | 10/5 | 5/10 | 5/10 | 2/8 | 2/8 | 2/8 | 2/8 | 5/5 | | 2/8 |
| Acrylonitrde | | | 5/5 | | | | 5/10 | | 1/2 | |
| Acrylamide | | | | | | | | | | |
| 2-Hydroxyethyl acrylate | | 0/2 | | | | | | 1/0 | | |
| Fumaric acid | | 1/0 | 1/0 | 2/0 | 2/0 | 2/0 | | | 2/0 | 2/0 |
| Itaconic acid | | | 1/1 | | | | 2/1 | 1/0 | | |
| Acrylic acid | 1/2 | 1/1 | | 0/1 | 0/1 | 0/1 | 0/2 | | 0/3 | 0/1 |
| Methacrylic acid | 1/1 | | 0/2 | 0/1 | 0/1 | 0/1 | | 0/3 | 1/1 | 0/1 |
| Chain transfer agent(s) | | | | | | | | | | |
| 2-Mercaptopropionic acid | 0.2/0.1 | | | 0.35/0.2 | 0.1/0.5 | | | 0.15/0 | | |
| a-Thiodiglycol | | 0.3/0.5 | | | 0.5/0 | | | 0.2/0 | | |
| 3,3'-Thiodipropionic acid | | | 0.15/0 | | | | | | 0.3/0.4 | |
| Dithiodiglycolic acid | | | 0.1/0.3 | | | | | | | 0.25/1.0 |
| Diallyl sulfide | | 0.1/1.2 | 0.2/1.4 | 0.2/0.8 | | | | | | |
| Diallyl disulfide | 0.3/1.0 | | | 0.1/1.0 | 0.5/0.5 | | | | | |
| Carbon tetrachloride | | | 0.5/2 | | 1.0/0 | 0.7/4.0 | 2.0/1.5 | 0/1.8 | | 3/0 |
| t-Dodecylmercaptan | | | | 0.2/1.8 | | | 0.8/0 | | 0.15/0.9 | 0.2/1.5 |
| Polymerization initiator(s) | | | | | | | | | | |
| Potassium persulfate | | | | 0.2/0.3 | | 0.5/0 | | 1/0 | | |
| Sodium persulfate | 1.5/0 | 1.5/0 | 0.5/1.5 | 0.2/0.3 | 0.5/0 | | 0.3/0.3 | | | 0.5/0 |
| Azobisisobutyronitrile | | | | | 0.2/0.5 | | | | 0.5/1.5 | 0.2/0.5 |

TABLE 28

| Measurement results | Example | | | | | | | | | |
|---|---|---|---|---|---|---|---|---|---|---|
| | 60 | 61 | 62 | 63 | 64 | 65 | 66 | 67 | 68 | 69 |
| Gel content (%) | 81 | 69 | 61 | 54 | 43 | 85 | 71 | 76 | 65 | 52 |
| Adhesive strength | 4.0 | 3.7 | 3.3 | 3.0 | 2.9 | 4.5 | 3.9 | 4.0 | 3.8 | 3.1 |
| Water resistance | 3.5 | 4.0 | 4.3 | 4.5 | 4.7 | 3.2 | 3.9 | 3.9 | 4.0 | 4.5 |
| Ink acceptability | 4.2 | 3.5 | 3.5 | 3.1 | 3.0 | 4.4 | 3.7 | 3.8 | 3.4 | 3.0 |
| Sheet gloss (%) | 69.2 | 70.5 | 70.2 | 71.1 | 70.9 | 69.5 | 69.3 | 69.9 | 70.1 | 70.7 |
| Blister resistance (°C.) | 490 | 530 | 530 | 540 | 550 | 490 | 520 | 500 | 530 | 540 |

TABLE 29

| Measurement results | Example | | | | | Comparative Example | | | | |
|---|---|---|---|---|---|---|---|---|---|---|
| | 70 | 71 | 72 | 73 | 74 | 24 | 25 | 26 | 27 | 28 |
| Gel content (%) | 78 | 72 | 55 | 39 | 69 | 76 | 56 | 82 | 69 | 42 |
| Adhesive strength | 4.1 | 4.0 | 3.2 | 2.8 | 3.7 | 3.0 | 2.0 | 3.5 | 2.6 | 1.8 |
| Water resistance | 3.8 | 4.0 | 4.5 | 4.8 | 4.1 | 3.1 | 3.7 | 2.4 | 3.4 | 4.0 |
| Ink acceptability | 4.0 | 3.6 | 3.3 | 3.0 | 3.5 | 3.3 | 2.5 | 3.6 | 3.0 | 2.2 |

TABLE 29-continued

| Measurement results | Example | | | | | Comparative Example | | | | |
|---|---|---|---|---|---|---|---|---|---|---|
| | 70 | 71 | 72 | 73 | 74 | 24 | 25 | 26 | 27 | 28 |
| Sheet gloss (%) | 68.7 | 69.6 | 71.5 | 71.3 | 71.0 | 68.5 | 69.3 | 69.0 | 69.5 | 70.2 |
| Blister resistance (°C.) | 490 | 510 | 540 | 540 | 520 | 470 | 510 | 470 | 490 | 530 |

What is claimed is:

1. A method of producing a copolymer latex which comprises subjecting a monomer mixture comprising
   (1) at least one conjugated diene monomer,
   (2) at least one ($C_4$-$C_{14}$)-ethylenically unsaturated monomer, said monomer being different from the monomer (1) above and different from the monomer (3) below, and
   (3) at least one member selected from the group consisting of (a) an ethylenically unsaturated monocarboxylic acid monomer, (b) an ethylenically unsaturated dicarboxylic acid monomer or an anhydride or half ester thereof, and (c) a mixture of (a) and (b), to emulsion polymerization by a process which comprises
      (a') subjecting a part of said monomer mixture to emulsion polymerization in the presence of a hydrophilic chain transfer agent to yield a copolymer latex, and subsequently
      (b') subjecting the remainder of the monomer mixture to emulsion polymerization in the presence of (1) the copolymer latex of (a') above and (2) a hydrophobic chain transfer agent.

2. A method of producing a copolymer latex which comprises subjecting a monomer mixture comprising
   (1) at least one conjugated diene monomer,
   (2) at least one ($C_4$-$C_{14}$)-ethylenically unsaturated monomer, said monomer being different from the monomer (1) above and different from the monomer (3) below, and
   (3) at least one member selected from the group consisting of (a) an ethylenically unsaturated monocarboxylic acid monomer, (b) an ethylenically unsaturated dicarboxylic acid monomer or an anhydride or half ester thereof, and (c) a mixture of (a) and (b), to emulsion polymerization by a process which comprises
      (a') subjecting 0.5 to 60 parts by weight out of 100 parts by weight of the said monomer mixture to emulsion polymerization in the presence of a hydrophilic chain transfer agent having a solubility in water at 20° C. of at least 0.006 mole per liter, to give a copolymer latex, and subsequently
      (b') subjecting the remainder of the said monomer mixture to emulsion polymerization in the presence of (1) said copolymer latex of (a') above and (2) a hydrophobic chain transfer agent having a solubility in water at 20° C. of less than 0.006 mole per liter.

3. The method as claimed in claim 1 or 2, wherein the hydrophilic chain transfer agent is a mercaptocarboxylic acid or its salt.

4. The method as claimed in claim 1 or 2, wherein the hydrophilic chain transfer agent is a hydroxyl-containing mercaptan.

5. The method as claimed in claim 1 or 2, wherein the hydrophilic chain transfer agent is a hydroxyl-containing (di)sulfide.

6. The method as claimed in claim 1 or 2, wherein the hydrophilic chain transfer agent is a carboxyl-containing (di)sulfide.

7. The method as claimed in claim 1 or 2, wherein the hydrophilic chain transfer agent is a carboxyl- and amino-containing (di)sulfide.

8. The method as claimed in claim 1 or 2, wherein the hydrophobic chain transfer agent is an alkylmercaptan.

9. The method as claimed in claim 1 or 2, wherein the hydrophobic chain transfer agent is a thiuram (di)sulfide.

10. The method as claimed in claim 1 or 2, wherein the hydrophobic chain transfer agent is a halogenated hydrocarbon.

11. The method as claimed in claim 1 or 2, wherein the hydrophobic chain transfer agent is α-methylstyrene dimer.

12. The method as claimed in claim 1 or 2, wherein the hydrophilic chain transfer agent is used in an amount of about 0.005-8 parts by weight per 100 parts by weight of the whole monomer mixture.

13. The method as claimed in claim 1 or 2, wherein the hydrophobic chain transfer agent is a carboxylic acid mercaptoalky ester of the formula

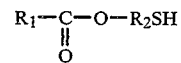

wherein $R_1$ is a univalent hydrocarbon residue and $R_2$ is a bivalent hydrocarbon residue.

14. The method as claimed in claim 13, wherein the chain transfer agent is a carboxylic acid mercaptoalkyl ester of the formula

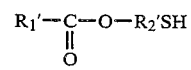

wherein $R_1'$ is an alkyl containing 1-24 carbon atoms and $R_2'$ is an alkylene containing 1-24 carbon atoms.

15. The method as claimed in claim 1 or 2, wherein the hydrophobic chain transfer agent is a mercaptocarboxylic acid alkoxyalkyl ester.

16. The method as claimed in claim 15, wherein the mercaptocarboxylic acid alkoxylalkyl ester is one shown by the formula

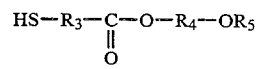

wherein $R_3$ is a bivalent hydrocarbon residue, $R_4$ is an alkyl and $OR_5$ is an alkoxy.

17. The method as claimed in claim 1 or 2, wherein the hydrophobic chain transfer agent is a dialkenyl (di)sulfide.

18. The method as claimed in claim 17, wherein the dialkenyl(di)sulfide is diallyl(di)sulfide.

19. A method of producing a copolymer latex which comprises subjecting a monomer mixture comprising
   (1) at least one conjugated diene monomer,
   (2) at least one ($C_4$-$C_{14}$)-unsaturated monomer, said monomer being different from the monomer (1)

above and different from the monomer (3) below, and (3) at least one member selected from the group consisting of (a) an ethylenically unsaturated monocarboxylic acid monomer, (b) an ethylenically unsaturated dicarboxylic acid monomer or an anhydride or half ester thereof, and (c) a mixture of (a) and (b), to emulsion polymerization in the presence of a carboxylic acid mercaptoalkyl ester of the formula

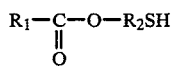

wherein $R_1$ is a univalent hydrocarbon residue and $R_2$ is a bivalent hydrocarbon residue, as a chain transfer agent.

20. A method of producing a copolymer latex which comprises subjecting a monomer mixture comprising
   (1) at least one conjugated diene monomer,
   (2) at least one ($C_4$–$C_{14}$)-ethylenically unsaturated monomer, said monomer being different from the monomer (1) above and different from the monomer (3) below, and
   (3) at least one member selected from the group consisting of (a) an ethylenically unsaturated monocarboxylic acid monomer, (b) an ethylenically unsaturated dicarboxylic acid monomer or an anhydride or half ester thereof, and (c) a mixture of (a) and (b), to emulsion polymerization in the presence of a mercaptocarboxylic acid alkoxyalkyl ester as a chain transfer agent.

21. A method of producing a copolymer latex which comprises subjecting a monomer mixture comprising
   (1) at least one conjugated diene monomer,
   (2) at least one ($C_4$–$C_{14}$)-ethylenically unsaturated monomer, said monomer being different from the monomer (1) above and different from the monomer (3) below, and
   (3) at least one member selected from the group consisting of (a) an ethylenically unsaturated monocarboxylic acid monomer, (b) an ethylenically unsaturated dicarboxylic acid monomer or an anhydride or half ester thereof, and (c) a mixture of (a) and (b), to emulsion polymerization in the presence of a dialkenyl (di)sulfide as a chain transfer agent.

* * * * *